US012610283B2

(12) United States Patent
Liu

(10) Patent No.: US 12,610,283 B2
(45) Date of Patent: Apr. 21, 2026

(54) BANDWIDTH ADJUSTMENT METHOD, SERVICE TRANSMISSION METHOD, NETWORK DEVICE AND READABLE STORAGE MEDIUM

(71) Applicant: ZTE CORPORATION, Shenzhen (CN)

(72) Inventor: Feng Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 536 days.

(21) Appl. No.: 18/016,889

(22) PCT Filed: Jul. 23, 2021

(86) PCT No.: PCT/CN2021/108193
§ 371 (c)(1),
(2) Date: Jan. 19, 2023

(87) PCT Pub. No.: WO2022/017509
PCT Pub. Date: Jan. 27, 2022

(65) Prior Publication Data
US 2024/0040435 A1 Feb. 1, 2024

(30) Foreign Application Priority Data

Jul. 23, 2020 (CN) .......................... 202010719664.9

(51) Int. Cl.
*H04W 28/20* (2009.01)
*H04W 28/26* (2009.01)
(52) U.S. Cl.
CPC ........... *H04W 28/20* (2013.01); *H04W 28/26* (2013.01)
(58) Field of Classification Search
CPC .................................................... H04W 28/20
See application file for complete search history.

(56) References Cited

U.S. PATENT DOCUMENTS

2016/0050044 A1   2/2016   Liu et al.
2018/0083891 A1   3/2018   Su et al.
(Continued)

FOREIGN PATENT DOCUMENTS

CN          101282297 A    10/2008
CN          104066017 A     9/2014
(Continued)

OTHER PUBLICATIONS

Japan Patent Office, first Office action dated Feb. 6, 2024, for corresponding JP application No. 2023-504374.
(Continued)

*Primary Examiner* — Jason E Mattis
*Assistant Examiner* — Latha Chakravarthy
(74) *Attorney, Agent, or Firm* — Li & Cai Intellectual Property (USA) Office

(57) ABSTRACT

The present application provides a bandwidth adjustment method, a service transmission method, a network device and a readable storage medium. The bandwidth adjustment method includes: receiving a slot adjustment request sent from a predetermined device, and acquiring a slot adjustment scheme notified by the predetermined device; completing slot adjustment preparation on a current device according to the slot adjustment scheme, and sending a slot adjustment acknowledge signal to the predetermined device; and extracting and carrying, in response to detecting a slot adjustment indication signal sent from the predetermined device, a client service according to slots after the slot adjustment scheme is executed, starting from a corresponding receiving cell and a corresponding sending cell.

20 Claims, 20 Drawing Sheets

(56) References Cited

U.S. PATENT DOCUMENTS

| | | | |
|---|---|---|---|
| 2019/0288783 A1 | 9/2019 | Zhong | |
| 2020/0204499 A1 | 6/2020 | Zhang et al. | |
| 2021/0359779 A1* | 11/2021 | Zhong | ................ H04L 41/0896 |

FOREIGN PATENT DOCUMENTS

| | | | | | |
|---|---|---|---|---|---|
| CN | 107888428 | A | | 4/2018 | |
| CN | 108632061 | A | * | 10/2018 | ......... H04L 41/0896 |
| CN | 109428840 | A | | 3/2019 | |
| CN | 112804078 | A | | 5/2021 | |
| EP | 2472748 | A1 | | 7/2012 | |
| EP | 2523416 | A1 | | 11/2012 | |
| EP | 2978237 | A1 | | 1/2016 | |
| JP | 2001508622 | A | | 6/2001 | |
| JP | 2020502927 | A | | 1/2020 | |

OTHER PUBLICATIONS

Eruopean Patent Office, extended European Search Report dated Jul. 16, 2024, for corresponding EP application No. 21846292.7.
WIPO, International Search Report issued on Oct. 18, 2021.
Bandwidth On-demand Service and Its Implementation.
China Patent Office, first Office Action dated Sep. 7, 2021, for corresponding Chinese application 202010719664.9.

* cited by examiner

Input Data | Sync | Block Payload

| Input Data | Sync (0 1 2) | Block Type Field | Block Payload (D0 D1 D2 D3 D4 D5 D6 D7) ... 65 |
|---|---|---|---|
| Bit Position: | 0 1 2 | D0 | D1 D2 D3 D4 D5 D6 D7 |
| Data Block Format: $D_0$ $D_1$ $D_2$ $D_3$ $D_4$ $D_5$ $D_6$ $D_7$ | 01 | $D_0$ | $D_1$ $D_2$ $D_3$ $D_4$ $D_5$ $D_6$ $D_7$ |
| Control Block Formats: | | | |
| $C_0$ $C_1$ $C_2$ $C_3$ $C_4$ $C_5$ $C_6$ $C_7$ | 10 | 0x1E | $C_0$ $C_1$ $C_2$ $C_3$ $C_4$ $C_5$ $C_6$ $C_7$ |
| $S_0$ $D_1$ $D_2$ $D_3$ $D_4$ $D_5$ $D_6$ $D_7$ | 10 | 0x78 | $D_1$ $D_2$ $D_3$ $D_4$ $D_5$ $D_6$ $D_7$ |
| $O_0$ $D_1$ $D_2$ $D_3$ $Z_4$ $Z_5$ $Z_6$ $Z_7$ | 10 | 0x4B | $D_1$ $D_2$ $D_3$   0x0000_0000 |
| $T_0$ $C_1$ $C_2$ $C_3$ $C_4$ $C_5$ $C_6$ $C_7$ | 10 | 0x87 | $C_1$ $C_2$ $C_3$ $C_4$ $C_5$ $C_6$ $C_7$ |
| $D_0$ $T_1$ $C_2$ $C_3$ $C_4$ $C_5$ $C_6$ $C_7$ | 10 | 0x99 | $D_0$ $C_2$ $C_3$ $C_4$ $C_5$ $C_6$ $C_7$ |
| $D_0$ $D_1$ $T_2$ $C_3$ $C_4$ $C_5$ $C_6$ $C_7$ | 10 | 0xAA | $D_0$ $D_1$ $C_3$ $C_4$ $C_5$ $C_6$ $C_7$ |
| $D_0$ $D_1$ $D_2$ $T_3$ $C_4$ $C_5$ $C_6$ $C_7$ | 10 | 0xB4 | $D_0$ $D_1$ $D_2$ $C_4$ $C_5$ $C_6$ $C_7$ |
| $D_0$ $D_1$ $D_2$ $D_3$ $T_4$ $C_5$ $C_6$ $C_7$ | 10 | 0xCC | $D_0$ $D_1$ $D_2$ $D_3$ $C_5$ $C_6$ $C_7$ |
| $D_0$ $D_1$ $D_2$ $D_3$ $D_4$ $T_5$ $C_6$ $C_7$ | 10 | 0xD2 | $D_0$ $D_1$ $D_2$ $D_3$ $D_4$ $C_6$ $C_7$ |
| $D_0$ $D_1$ $D_2$ $D_3$ $D_4$ $D_5$ $T_6$ $C_7$ | 10 | 0xE1 | $D_0$ $D_1$ $D_2$ $D_3$ $D_4$ $D_5$ $C_7$ |
| $D_0$ $D_1$ $D_2$ $D_3$ $D_4$ $D_5$ $D_6$ $T_7$ | 10 | 0xFF | $D_0$ $D_1$ $D_2$ $D_3$ $D_4$ $D_5$ $D_6$ |

FIG. 3

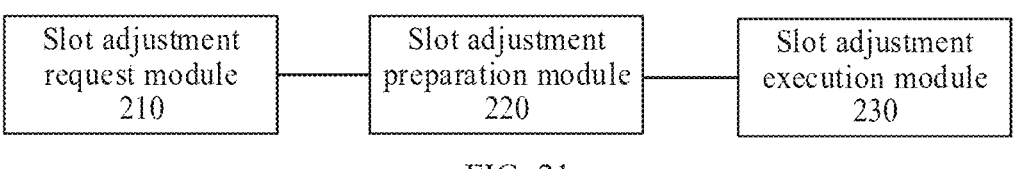

| Slot adjustment request module 210 | Slot adjustment preparation module 220 | Slot adjustment execution module 230 |

FIG. 21

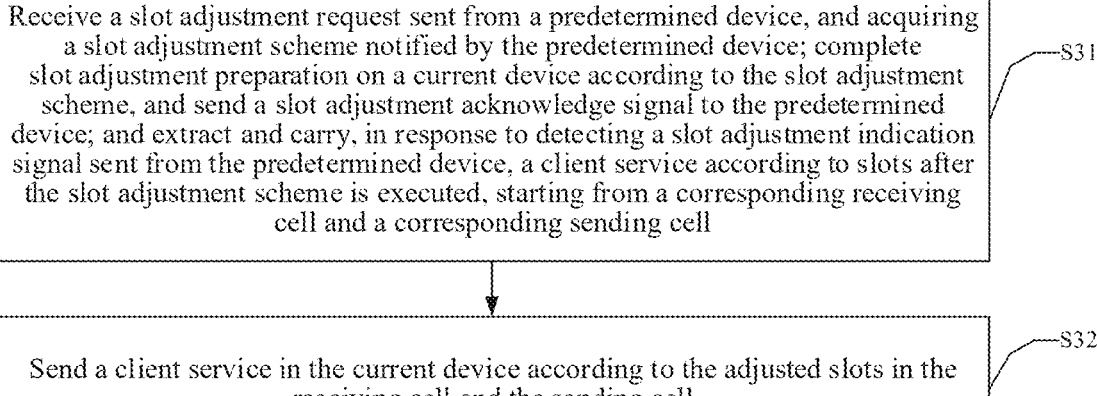

Receive a slot adjustment request sent from a predetermined device, and acquiring a slot adjustment scheme notified by the predetermined device; complete slot adjustment preparation on a current device according to the slot adjustment scheme, and send a slot adjustment acknowledge signal to the predetermined device; and extract and carry, in response to detecting a slot adjustment indication signal sent from the predetermined device, a client service according to slots after the slot adjustment scheme is executed, starting from a corresponding receiving cell and a corresponding sending cell — S310

Send a client service in the current device according to the adjusted slots in the receiving cell and the sending cell — S320

FIG. 22

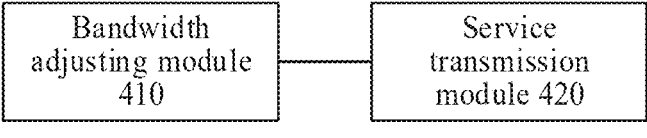

| Bandwidth adjusting module 410 | Service transmission module 420 |

FIG. 23

BANDWIDTH ADJUSTMENT METHOD, SERVICE TRANSMISSION METHOD, NETWORK DEVICE AND READABLE STORAGE MEDIUM

CROSS-REFERENCE TO RELATED APPLICATION

The present disclosure is a National Phase Application filed under 35 U.S.C. 371 as a national stage of PCT/ CN2021/108193, fled on Jul. 23, 2021 an application claiming the priority to Chinese Patent Application No. 202010719664.9 filed with the CNIPA on Jul. 23, 2020, the entire contents of which are incorporated herein by reference.

TECHNICAL FIELD

The present application relates to the field of communication technology, and specifically relate to a bandwidth adjustment method, a service transmission method, a network device and a readable storage medium.

BACKGROUND

In a communication network, as the client service volume increases and decreases, the bandwidth for a client service is adjusted by adjusting the number of slots carrying the client service. Since a slot adjustment command is transferred to different devices at different time points that cannot be synchronized, the slot adjustment is actually performed on different devices at different time points, causing inconsistency in the number of slots at the receiving port and at the sending port in a time window. If the inconsistency in the number of slots in the receiving direction and the sending direction lasts too long, it tends to cause buffer overflow and interrupt a client service.

SUMMARY

An embodiment of present application provides a bandwidth adjustment method, including: receiving a slot adjustment request sent from a predetermined device, and acquiring a slot adjustment scheme notified by the predetermined device; completing slot adjustment preparation on a current device according to the slot adjustment scheme, and sending a slot adjustment acknowledge signal to the predetermined device; and extracting and carrying, in response to detecting a slot adjustment indication signal sent from the predetermined device, a client service according to slots after the slot adjustment scheme is executed, starting from a corresponding receiving cell and a corresponding sending cell.

An embodiment of present application provides a service transmission method, including: adjusting according to the bandwidth adjustment method of the present application, slots in a receiving cell and a sending cell of a current device; and sending a client service in the current device according to the adjusted slots in the receiving cell and the sending cell.

An embodiment of present application provides a network device, including: one or more processors; and a memory having one or more programs stored thereon which, when executed by the one or more processors, cause the one or more processors to implement the method described in any embodiment of the present application.

An embodiment of the present application provides a readable storage medium having a computer program stored thereon which, when executed by a processor, causes the processor to implement the method described in any embodiment of the present application.

BRIEF DESCRIPTION OF DRAWINGS

FIG. 3 is a schematic diagram of an 64/66 encoding structure according to the present application.

FIG. 21 is a schematic structural diagram of a bandwidth adjustment apparatus according to the present application.

FIG. 22 is a schematic flowchart of a service transmission method according to the present application.

FIG. 23 is a schematic flowchart of a service transmission apparatus according to the present application.

DETAIL DESCRIPTION OF EMBODIMENTS

For clarity and better understanding of the objects, technical solution and advantages of the application, embodiments of the present application will now be described in detail in conjunction with the accompanying drawings. It should be noted that the embodiments of the present application and features therein may be combined with each other in any manner as long as they are not contradictory.

The rapid increase of user network information traffic promotes the rapid development of communication network information transmission bandwidth. The interface bandwidth speed of communication devices has been increased from 10M (bit/s, the bandwidth unit is omitted hereafter) to 100M, then to 1G and 10G, and up to 100G now. There are a great deal of optical modules of 100G commercially available now. In high bandwidth applications, the network is still desired to transmit existing low-rate private line services, such as private line client services of electric power, banks, railways and the like, such private line bandwidth purchased by clients is typically much smaller than the device network interface bandwidth, but has high requirements on the service quality of bandwidth services. Therefore, the bandwidth is desired to be strictly guaranteed (in an exclusive state, not shared by other units even if the client does not use), and physically isolated from influence of other client services. When a high bandwidth service and a low bandwidth service co-exist over the network at the same time, different services are desired to be strictly isolated physically, and protected from being influenced by each other completely. To this end, a common solution is to divide slots on a cell for transmission.

Figure 1:
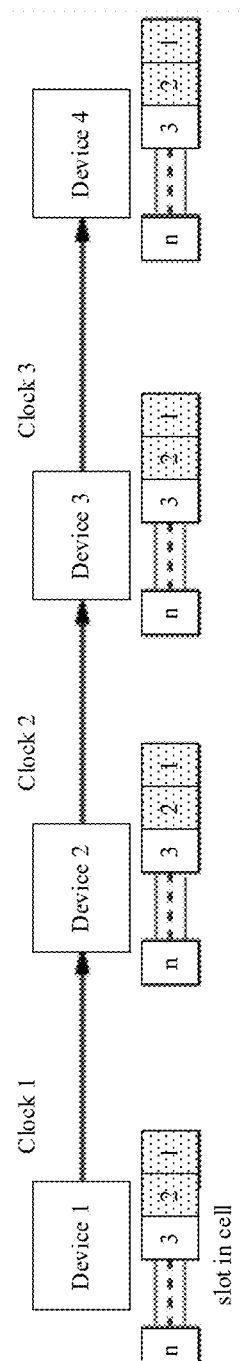
FIG. 1 is a schematic diagram of a cell streaming a client service over a network according to the present application.

FIG. 1 is a schematic diagram of a cell streaming a client service over a network according to the present application. In FIG. 1, 4 node devices on a network communication link are schematically shown, i.e., a device 1, a device 2, a device 3 and a device 4. The device 1 is a source device on the communication link, while the devices 2, 3 and 4 are intermediate devices. The number of devices in FIG. 1 is merely illustrative. According to the practical application environment and requirements, the node devices on the communication link may be flexibly set.

As shown in FIG. 1, when a cell stream is transferred over a network communication link, multiple slots are divided on each cell, and a client service is carried over different slots, so that the bandwidth carrying the client service can be flexibly changed. For example, each individual slot may correspond to a smaller transmission bandwidth. When the client service has a relatively low speed, fewer slots may be selected for carrying and transmission, so that a smaller bandwidth is used for carrying the client service. When the client service has a relatively high speed, more slots may be selected for transmission, so that a larger bandwidth is used for carrying the client service. The speed of the client service is associated with and corresponds to the number of desired carrying slots, so that the bandwidth requirement corresponding to a client service at any speed can be carried, and different service speed and bandwidth requirements of various types of client services are met.

All slots in the cell are strictly isolated so that strict physical isolation can be achieved between different clients. In practical service applications, the client service may change over a period of time (e.g., months, years). For example, for an increasing client service, if the client service bandwidth increases after a period of time, the number of carrying slots is desired to be increased, and for a declining client service, if the client service bandwidth decreases after a period of time, the number of carrying slots is desired to be decreased.

Figure 2:
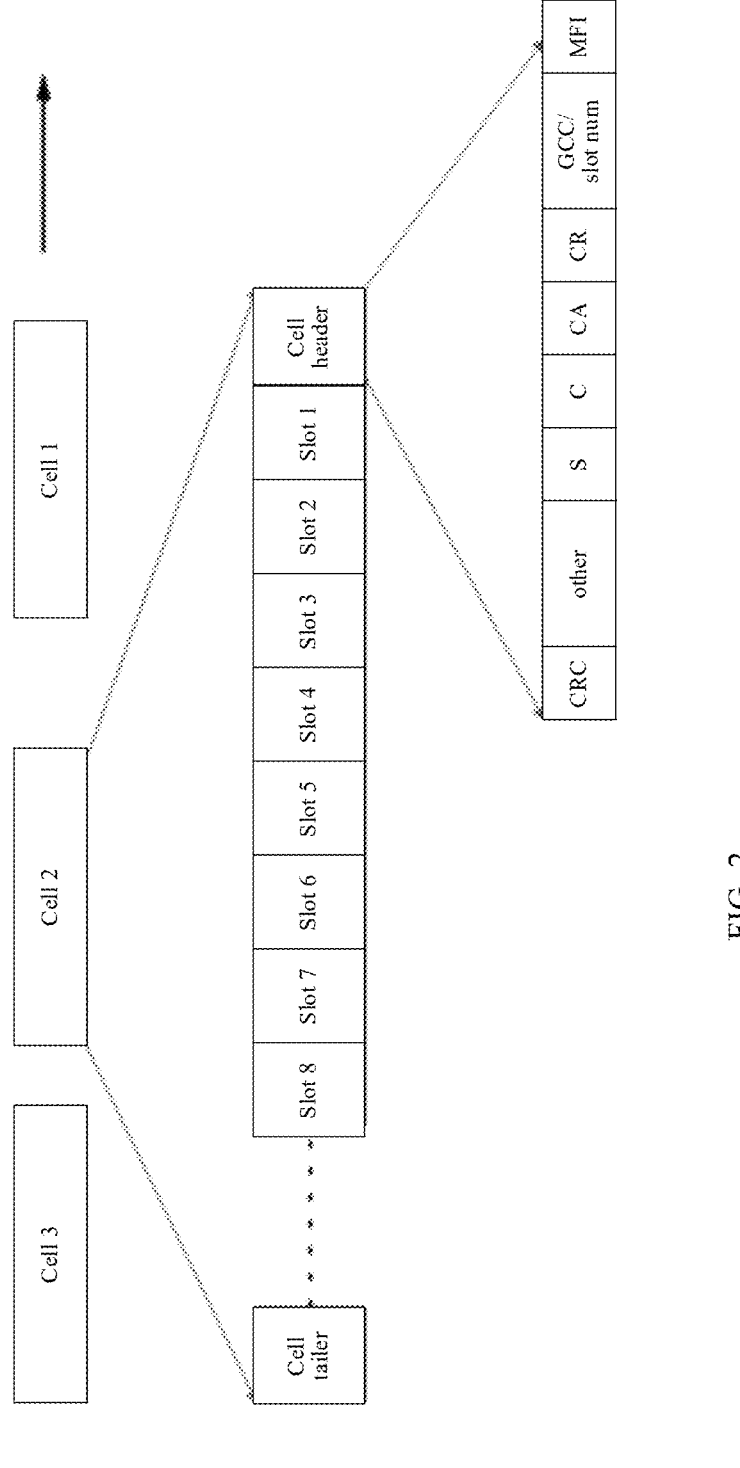
FIG. 2 is a schematic diagram of a basic structure of a cell according to the present application.

FIG. 2 is a schematic diagram of a basic structure of a cell according to the present application. As shown in FIG. 2, in practical applications, a cell structure is typically used to transfer a client service. A plurality of slots may be divided in the cell structure, and each slot is typically an information piece of a fixed length. The cell structure may be understood as a message structure, such as an Ethernet message.

In FIG. 2, the cell structure may include a cell header, a cell container, and a cell trailer. A cell overhead is carried in the cell header, and generally includes: a cell multi-frame indicator (MFI), a general communication channel (GCC), a slot number (Slot num), a slot configuration request (CR) indicator, a slot configuration acknowledge (CA) indicator, a slot configuration come into force (C) indicator, slot status (S), and cyclic redundancy check (CRC).

With continued reference to FIG. 2, a plurality of slots, each having a fixed length, may be divided in the cell container. The slots are sequentially arranged in the cell and transferred with the cell over the network. Each client service has a fixed slot arrangement and is carried at a corresponding slot position, and different clients may select different slot positions for carrying. In the case of a large client bandwidth, a plurality of slot positions are selected for carrying, and in the case of a small client bandwidth, fewer slot positions are selected for carrying.

FIG. 3 is a schematic diagram of an 64/66 encoding structure according to the present application. In an embodiment of the present application, before the client service is carried in a slot manner, the client service may be encoded, for example, using 64/66 (or 10 bit/8 bit) coding blocks.

As shown in FIG. 3, the 64/66 encoded client service stream becomes a 66-bit code stream, and a speed of the client service code stream may be adjusted so that a code stream speed of the client service is the same as a speed of the carrying slots. It should be understood that since the message in a high speed Ethernet interface is typically converted into 64/66 coding blocks, a message length of the client service stream in the present application may be described by taking 64/66 coding blocks of a fixed length as an example.

Figure 4:
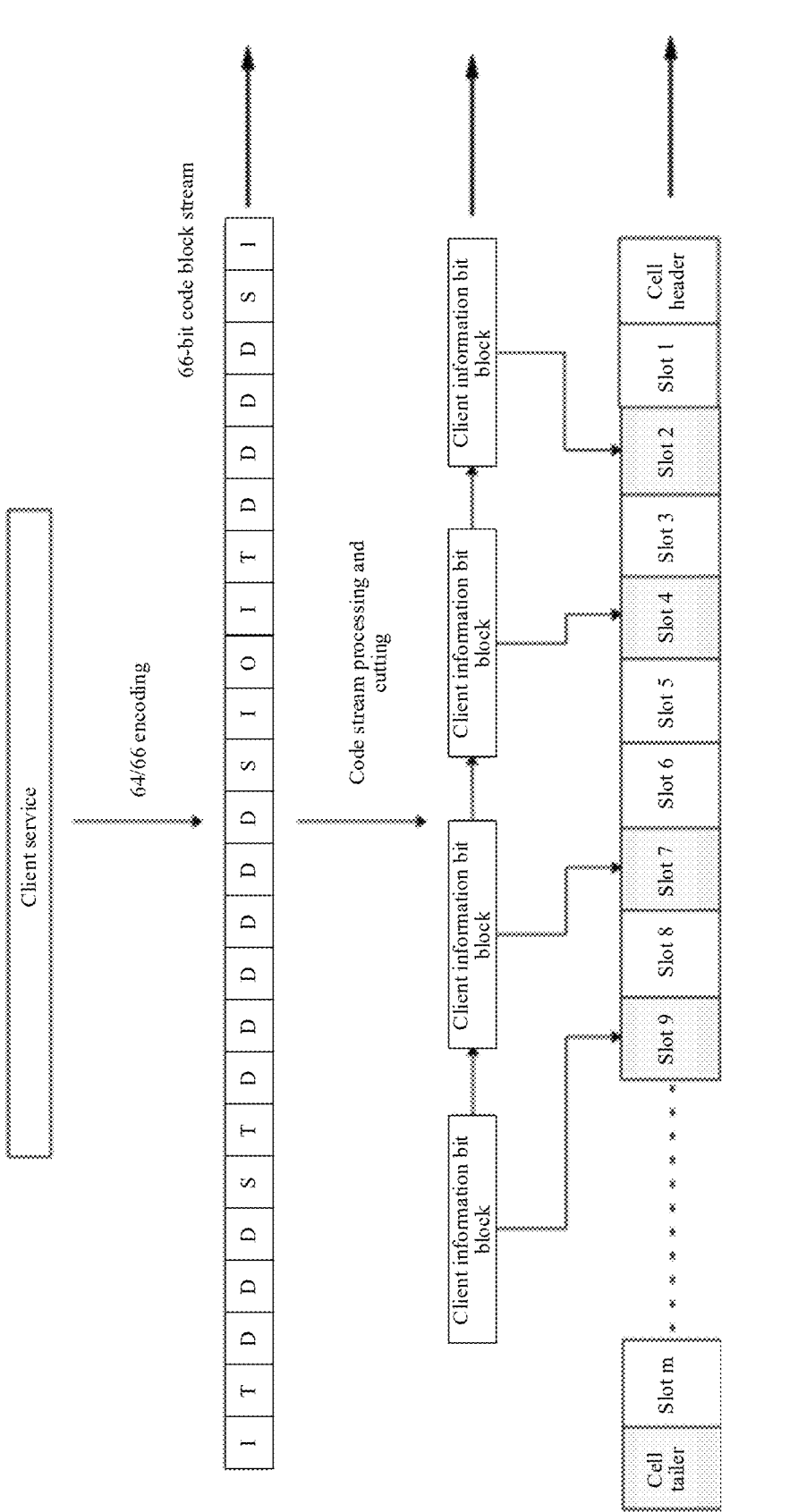
FIG. 4 is a schematic diagram illustrating a process of mapping a client service to a cell according to the present application.

FIG. 4 is a schematic diagram illustrating a process of mapping a client service to a cell according to the present application. The client data message, after 64/66 encoding, may encode 64-bit client data content into 66-bit information blocks, and these 66-bit coding blocks may be divided into two types, one is data block (also called D-block), and the other is control block.

Exemplarily, the control block may include a message start indication block, i.e., an S block, configured to indicate a message header block; a message end indication block, i.e., a T block, configured to indicate a message tail block; a failure information indication block, i.e., an O block, and an idle information indication block, i.e., an IDLE block (or I block).

As shown in FIG. 4, in one embodiment, an Ethernet message is encoded into a code block stream, starting with an S block, then intermediate D blocks, and then ended with a T block (i.e., S block+D block+T block), where there are some I blocks and an O block between two successive message code stream blocks. The I block is an idle block, and when there is an idle position without any data message, the idle position is filled with an I block; and there may be further an O block between messages to transfer failure information.

In addition to filling an idle position between messages, the idle block may be further used for speed adaptation. When the number of idle or O blocks filled is increased, a proportion of valid service streams is reduced, which is equivalent to reducing the service speed. Conversely, when the number of idle or O blocks filled is decreased, the proportion of valid service streams is increased, which is equivalent to increasing the service speed.

Since idle blocks may be provided between messages, and according to the 802.3 standard, the operations of inserting and deleting idle blocks are both performed between messages, there are fewer opportunities for the inserting or deleting operations, and the operations of inserting and deleting idle block between messages are slowly conducted, which may merely adapt to a scenario of small changes in the speed difference, but cannot adapt to a scenario of great changes in the speed difference in time.

If the speed of the client code stream is slightly higher than the speed of the carrying slots, that is, if a difference between the two speeds is smaller than a preset threshold, idle slot blocks in the client code stream may be deleted. When the speed of the client code stream is slightly lower than the speed of the carrying slots, that is, if a difference between the two speeds is smaller than a preset threshold, idle slot blocks in the client code stream may be added. For example, idle slot blocks are inserted between two successive messages in the client code stream.

Figure 5:
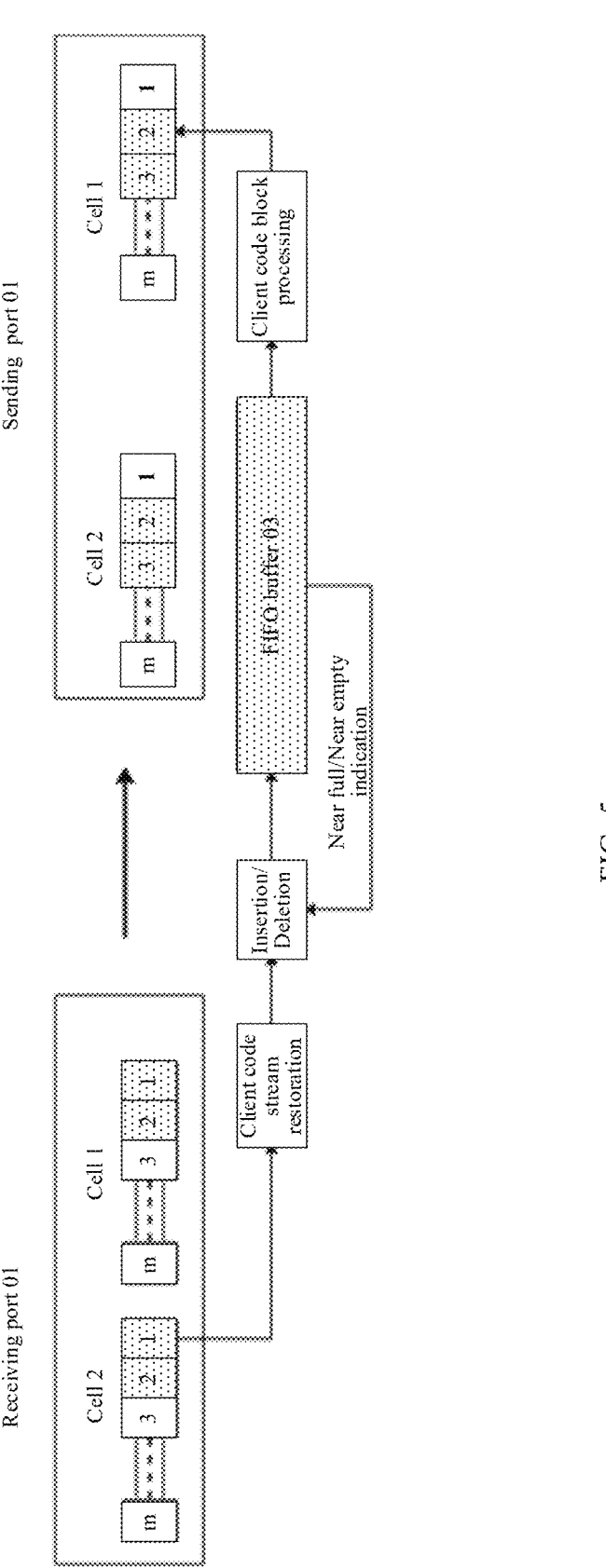
FIG. 5 is a schematic diagram illustrating a process of processing client service information by a cell in a device according to the present application.

FIG. 5 is a schematic diagram illustrating a process of processing client service information by a cell in a device according to the present application. In FIG. 5, schematically shown are a receiving port 01, a sending port 02 and a buffer 03 of the device, and cells at the receiving port 01 and the sending port 02, such as a cell 1 and a cell 2, and a slot 1, a slot 2, . . . , a slot m in each cell, where m is an integer greater than 1. As an example, the buffer 03 may be a first input first out (FIFO) data buffer, which may be referred to as FIFO buffer hereafter.

It should be understood that the number of slots at the receiving port and the number of slots at the sending port shown in FIG. 5 are merely illustrative. The number of cells in a node device on the communication link may be flexibly set according to the actual application environment and requirements.

In an embodiment, the encoded 66-bit block client code stream is cut into corresponding information bit blocks according to a size of the carrying slots, and then placed on the carrying slots to be sent out with the cell. For any intermediate device in the network (e.g., the above device 2 or device 3 shown in FIG. 1), a client service may, for a client service stream, be extracted from the slots carrying the client service in the cell, and restored to the encoded code stream before mapping (e.g., a 66-bit block stream), and then the client encoded code stream may be held in the FIFO buffer. Before the cell at the sending port 02 is sent, the client service code stream is read out from the buffer 03 and re-mapped to a slot position for carrying the client in the cell.

In FIG. 5, in the cell received at the receiving port 01, a slot 1 and a slot 2 have a client code stream carried thereon. After receiving the cell, the receiving port 01 extracts client information bit stream blocks carried over the slot 1 and the slot 2 for client code block restoration, and buffers the client code block in the buffer 03. When a cell is sent at the sending port 02, a client code block is read out from the buffer 03, processed and cut into information bit blocks of a slot size, and then mapped to the slot position of the cell to be sent out with the cell. For example, at the sending port 02, the client information is carried over a slot 2 and a slot 3, and the client information bit blocks may be carried over the slot 2 and the slot 3 to be transferred with the cell.

With continued reference to FIG. 5, different devices in the network has a deviation in clock frequency (a clock deviation of an Ethernet standard specification device interface is within ±100 PPM, where PPM means parts per million), and due to a possible slight difference in the cell speed at the receiving port and the sending port, there may be a slight deviation in the slot speed. As a result, the client is carried at different speeds at the receiving port and the sending port, which is finally reflected in changes of the buffer depth. When the cell speed in the receiving direction is higher than the cell speed in the sending direction, a buffer writing speed is higher than a reading speed, so the buffer is accumulated and tends to be full. Conversely, when the cell speed in the receiving direction is lower than the cell speed in the sending direction, the buffer writing speed is lower than the reading speed, so the buffer accumulation is reduced, and tends to be empty.

For example, when the buffer 03 is nearly full, idle information blocks between messages in the client code stream may be deleted appropriately before being written into the buffer 03, and the number of client service code blocks may be reduced. When the buffer 03 is nearly empty, idle information blocks may be inserted between messages in the client code stream appropriately before being written into the buffer 03, and the number of client service code blocks may be increased. In this manner, the problem of mismatched speeds at the receiving port and at the sending port can be dynamically adapted.

In the present application, inserting idle information blocks into the code stream is in accordance with the 802.3 standard, and since the idle blocks are inserted merely between two successive client messages, the message structure in the original client service code stream is not damaged. Since the speed deviation between the receiving direction and the sending direction is very small, the frequency of actual insertion or deletion of idle blocks is very low, and since the message length is limited (the longest Ethernet message is 9600 bytes, which is converted into 1200 code blocks), there will be enough time to wait for an idle block addition/deletion operation at a position between successive messages.

In practical service applications, in the case of a relatively small client bandwidth, the desired bandwidth of the carrying pipeline is also small, so the requirement can be met with merely a small number of carrying slots. For a client with increased services, if the client service volume is to be increased, more slots are desired to carry client services, which involves a slot addition operation. For a client with decreased services, if the client service bandwidth is reduced, the number of carrying slots is desired to be decreased.

Figure 6:
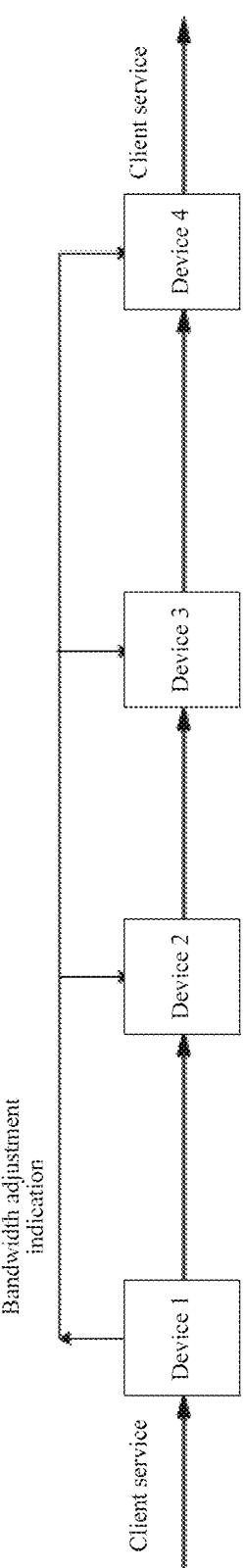
FIG. 6 is a schematic diagram illustrating a notification process of bandwidth adjustment information in a network according to the present application.

The following describes a bandwidth adjustment information notification process in the communication network taking increasing the number of slots as an example and with reference to FIG. 6. For the sake of simplicity, the bandwidth adjustment information notification process corresponding to decreasing the number of slots is consistent with the bandwidth adjustment information notification process corresponding to increasing the number of slots, and thus is not repeated here.

FIG. 6 is a schematic diagram illustrating a notification process of bandwidth adjustment information in a network according to the present application. The same or equivalent reference numerals in FIG. 6 and FIG. 1 denote identical structures.

As shown in FIG. 6, when a slot is to be added, the source device 01 (or centralized control center) may send to all downstream devices a slot adjustment request command for adding slots in each device. When the slot adjustment request command is sent to all the devices, each device plans a slot position for the adjustment according to the command, carries out the preparation work of slot addition, and adds the corresponding slot after the preparation work is completed.

Figure 7:
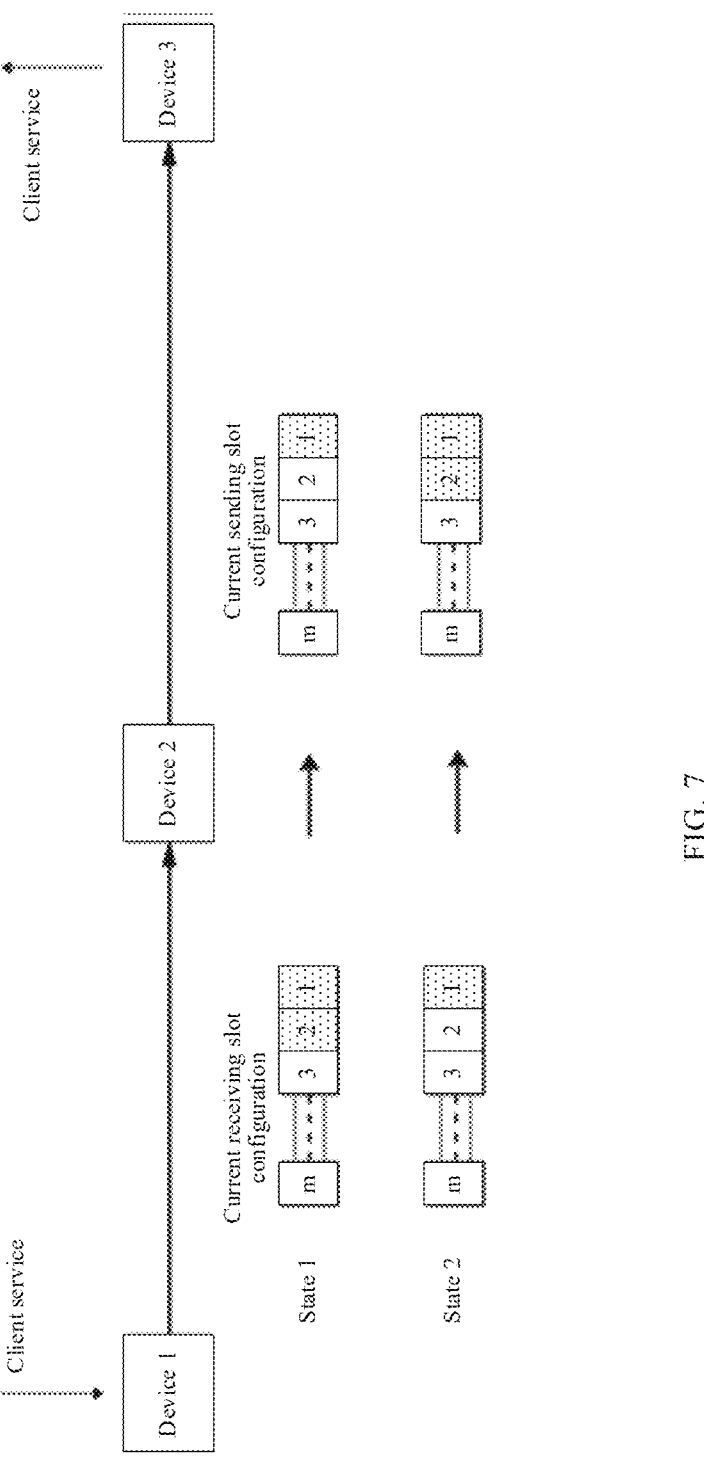
FIG. 7 is a diagram of mismatched number of cells at a receiving port and a sending port in a device according to the present application.

FIG. 7 is a diagram of mismatched number of cells at a receiving port and a sending port in a device according to the present application. The same or equivalent reference numerals in FIG. 7 and FIG. 1 denote identical structures.

As shown in FIG. 7, in practical applications, since the slot adjustment command is transferred to different devices at different time points that cannot be synchronized, the slot adjustment is actually performed on different devices at different time points after preparation, causing inconsistency in the number of slots at the receiving port and at the sending port in a time window. For the device 2, in a slot addition operation, if a slot has been added in an upstream device and a client service is carried over the slot 2, the client service is carried over the slot 2 in a cell at the receiving port of the device 2, but not the slot 2 at the sending port of the device 2 since the sending port is not adjusted. In this manner, the client service is carried over the slot 1 and the slot 2 at the receiving port, while merely the slot 1 carries the client service at the sending port. Therefore, the number of carrying slots at the receiving port and the number of carrying slots at the sending port are not the same, which is twice as difference. When the number of slots is not consistent at upstream and downstream, the client information code stream has a very large speed difference at upstream and downstream. Therefore, the requirement of a scenario of a large speed difference cannot be met merely by adding/deleting idle blocks between messages. When the condition of inconsistent upstream and downstream slot numbers lasts for a long time, if the code stream speed of the client service is adjusted merely by adding/deleting idle blocks between messages, buffer overflow will occur when timely speed adaptation fails, and the client service will be interrupted.

With continued reference to FIG. 7, in the present application, when the slot addition/deletion is asynchronous among devices in a network, two states will occur on each device at certain time points, that is: a state 1 where the number of slots in the receiving direction is greater than the number of slots in the sending direction; and a state 2 where the number of slots in the receiving direction is less than the number of slots in the sending direction. As long as the number of slots is inconsistent in the receiving direction and the sending direction and the case lasts for a long time, buffer overflow will occur and the client service will be interrupted when the requirements cannot be met by adding or deleting idle blocks between messages.

Therefore, it is desirable to provide a method for dynamically adjusting the number of slots for a client service, and flexibly and dynamically adjusting the number of slots for carrying the client service without affecting the client service.

Figure 8:
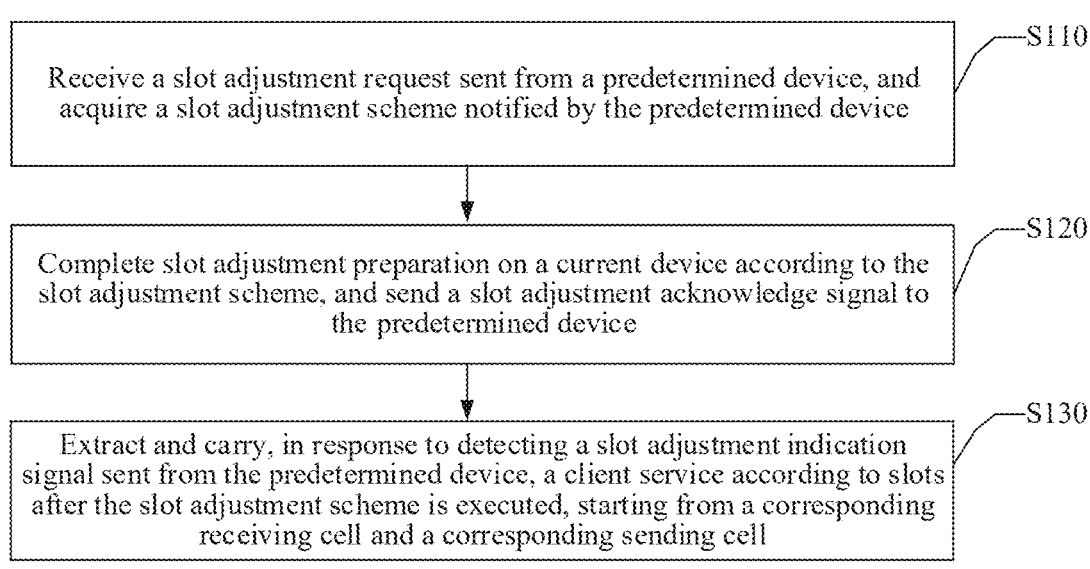
FIG. 8 is a schematic flowchart of a bandwidth adjustment method according to the present application.

FIG. 8 is a schematic flowchart of a bandwidth adjustment method according to the present application. As shown in FIG. 8, the bandwidth adjustment method of the present application may include the following operations S110 to S130.

At operation S110, receiving a slot adjustment request sent from a predetermined device, and acquiring a slot adjustment scheme notified by the predetermined device.

At operation S120, completing slot adjustment preparation on a current device according to the slot adjustment scheme, and sending a slot adjustment acknowledge signal to the predetermined device.

At operation S130, extracting and carrying, in response to detecting a slot adjustment indication signal sent from the predetermined device, a client service according to slots after the slot adjustment scheme is executed, starting from a corresponding receiving cell and a corresponding sending cell.

According to the bandwidth adjustment method of the present application, after receiving the slot adjustment request sent from the predetermined device and acquiring the slot adjustment scheme sent from the predetermined device, the preparation work of slot adjustment at the current device may be completed and an acknowledge signal may be returned, and when a slot adjustment indication signal is received, the client service is sent and extracted from a corresponding cell according to the adjusted slot, so that the bandwidth adjustment for carrying client service information is completed at the current device.

In the bandwidth adjustment method of the present application, each device may, according to a preset correspondence relationship between a slot adjustment indication signal and a cell at which the current device starts slot adjustment, take the detected slot adjustment indication signal as a reference, and perform slot adjustment according to the predetermined slot adjustment scheme starting from a corresponding cell position, so that the slot adjustment time, slot adjustment position and adjustment content of each device are controllable, and the problem of inconsistent slot adjustment performed by the receiving port and the sending port due to the fact that the slot adjustment command transferred by the system cannot reach each device synchronously is avoided, thereby flexibly and dynamically adjusting the number of slots for carrying the client service without affecting the client service.

The slot adjustment scheme includes at least one of: the number of slots to be adjusted, an addition/deletion operation type, a slot adjustment position in a cell, an order of slot adjustment at a receiving end and a sending end, and a correspondence relationship between a slot adjustment indication signal and a cell at which the current device starts to execute slot adjustment. The correspondence relationship indicates: after the slot adjustment indication signal is detected, a corresponding receiving cell at which the current device starts to execute the slot adjustment, and a corresponding sending cell at which the current device starts to execute the slot adjustment. If the slot adjustment indication signal is information sent from a previous neighboring device, the cell at which the receiving port of the current device starts to execute slot adjustment is the same as the cell at which the sending port of the previous device starts to execute slot adjustment.

The slot adjustment indication signal may be an indication signal that is transferred in one or more cells in a channel associated mode and has a preset number of bits, a combination of commands transferred in the channel associated mode, or a signal identified by content change information of a slot position.

The indication signal having a preset number of bits may be a single-bit indication signal or a multi-bit (at least two bits) indication signal. Each command in the combination of commands transferred in the channel associated mode may be a command having a designated number of bits.

If the slot adjustment indication signal is a signal identified by content change information of the slot position, the bandwidth adjustment method of the present application further includes: determining, if it is detected that slots in the received cell are increased and content information of a slot increased position has a first predetermined change, or slots in the received cell are decreased and content information of a slot decreased position has a second predetermined change, that the slot adjustment indication signal is detected. The first predetermined change includes the content information of the slot increased position changing from idle content to non-idle content, and the second predetermined change includes the content information of the slot decreased position changing from non-idle content to idle content.

In implementation, there may be various types of slot adjustment indication signals (hereinafter referred to as "start indication signals" for short), each of which may be indicated by a single-bit indication signal or a multi-bit indication signal, such as a configuration come into force (C or CCC) signal. The slot adjustment indication signal is transferred in the channel associated mode in the cell, and may be equivalent to various combinations of start indication signals in function. In applications, instead of a separate indication signal or combination of commands, the start indication signal may be obtained indirectly.

For example, a change in the slot position content changed in the slot adjustment is used as the start indication signal, and a special change is detected in the content of the position where a slot is added or reduced, and used as the start indication signal. When a slot is added, if the position content of the newly added slot is changed from all idle content before into non-idle content now, it indicates that the newly added slot position starts to carry a client service, and this change is used as an indication signal of slot adjustment and determined as a start indication signal. When a slot is reduced, if the position content of the slot to be reduced is changed from non-idle content into idle content, it indicates that the slot position to be reduced will not carry any client service any more, and this change is used as an indication signal of slot adjustment and determined as a start indication signal.

The following describes a negotiation process between devices during slot adjustment and a process of enabling slot adjustment according to an embodiment of the present application, with reference to FIGS. 9 to 13.

Figure 9:
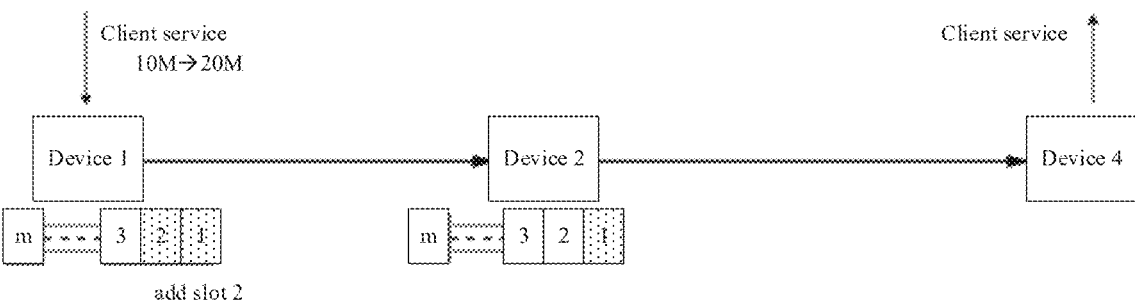
FIG. 9 is a schematic diagram illustrating a process of negotiating and enabling increasing the number of slots between two devices according to the present application.

FIG. 9 is a schematic diagram illustrating a process of negotiating and enabling increasing the number of slots between two devices according to the present application. As shown in FIG. 9, taking increasing a slot 2 in the cell as an example, when the bandwidth is desired to be increased (for example, from 10M to 20M), the negotiation process for increasing the number of slots between two devices includes the following operations S01 to S04.

At operation S01, an upstream source device 1 sends a slot addition adjustment request signal, such as a configure-request (CR) signal, to a downstream sink device 2.

In this operation, a slot addition adjustment request signal is sent, for example, requesting to add the slot 2 in the cell.

At operation S02, after receiving the slot addition adjustment request signal, the downstream sink device 2 starts preparation work of slot addition, and, after the preparation work of the slot addition adjustment is completed, sends a slot adjustment acknowledge signal, such as a configuration acknowledge (CA) signal to the upstream source device 1.

At operation S03, after receiving the response that all downstream devices in the network have completed the preparation work, the upstream source device 1 sends a slot adjustment indication signal to formally start the slot addition. After the slot adjustment indication signal is received at receiving ports of all downstream devices, the slot adjustment indication signal is forwarded to a sending port and then sent to a downstream device of the current device. By analogy, all device forwards the slot adjustment indication signal to respective downstream devices.

Through the above operations S02 to S03, all device forwards the slot adjustment indication signal to respective downstream devices.

At operation S04, for each of the devices, after the slot adjustment indication signal is sent from the sending port, and according to a correspondence relationship between the slot adjustment indication signal and a first cell enabling slot addition, a client service is carried over the newly added slot position (for example, slot 2) of the corresponding cell.

Through the operations S01 to S02, the negotiation for slot adjustment is completed between any two neighboring devices in the network in a same manner.

Through the operations S03 to S04, after the negotiation for slot adjustment is completed at each device and the slot adjustment indication signal is received at the receiving port of each device, and according to the correspondence relationship between the slot adjustment indication signal and the first cell enabling slot addition, the client service is extracted from the newly added slot position (for example, slot 2) of the corresponding cell. In this manner, the adjustment process of slot addition is completed.

Figure 10:
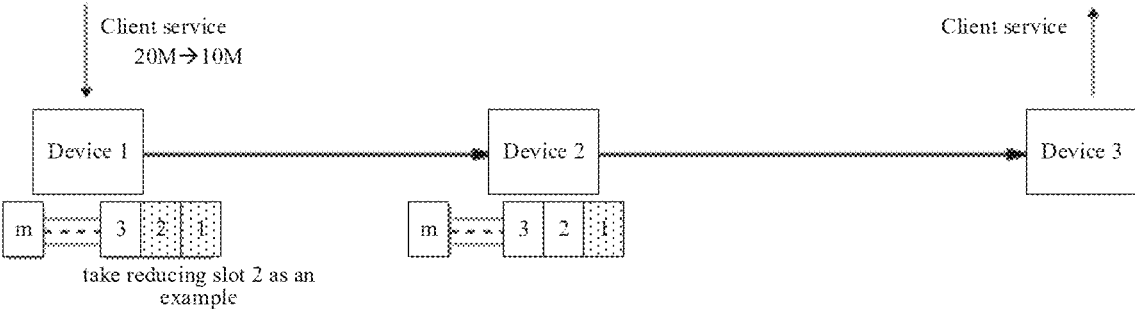
FIG. 10 is a schematic diagram illustrating a process of negotiating and enabling decreasing the number of slots between two devices according to the present application.

FIG. 10 is a schematic diagram illustrating a process of negotiating and enabling decreasing the number of slots between two devices according to the present application. As shown in FIG. 10, taking decreasing a slot 2 in the cell as an example, when the bandwidth is desired to be decreased (for example, from 20M to 10M), the negotiation process for decreasing the number of slots between two devices includes the following operations S11 to S14.

At operation S11, an upstream source device 1 sends a slot reduction adjustment request signal, such as a CR signal to a downstream sink device 2.

At operation S12, after receiving the slot reduction adjustment request signal, the downstream device 2 starts preparation work of slot reduction, and, after the preparation work of the slot reduction adjustment is completed, sends an acknowledge signal, such as a CA signal to the upstream source device 1.

Through the above steps S11 to S12, the negotiation for slot adjustment is completed between any two neighboring devices in the network in a same manner.

At operation S13, after receiving the response that all downstream devices in the network have completed the preparation work, the upstream source device 1 sends a slot adjustment indication signal to formally start the slot reduction. After the slot adjustment indication signal is received at receiving ports of all downstream devices, the slot adjustment indication signal is forwarded to a sending port and then sent to a downstream device of the current device. By analogy, all device forwards the slot adjustment indication signal to respective downstream devices.

At operation S14, for each of the devices, after the slot adjustment indication signal is sent from the sending port, and according to a correspondence relationship between the slot adjustment indication signal and a first cell enabling slot reduction, no client service is carried over the reduced slot position (for example, slot 2) of the corresponding cell any more. Similarly, for each of the devices, after the slot adjustment indication signal is received at the receiving port, according to the correspondence relationship between the slot adjustment indication signal and the first cell enabling slot reduction, no client service is extracted from the reduced slot position (for example, slot 2) of the corresponding cell any more. In this manner, the adjustment process of slot reduction is completed.

Figure 11:
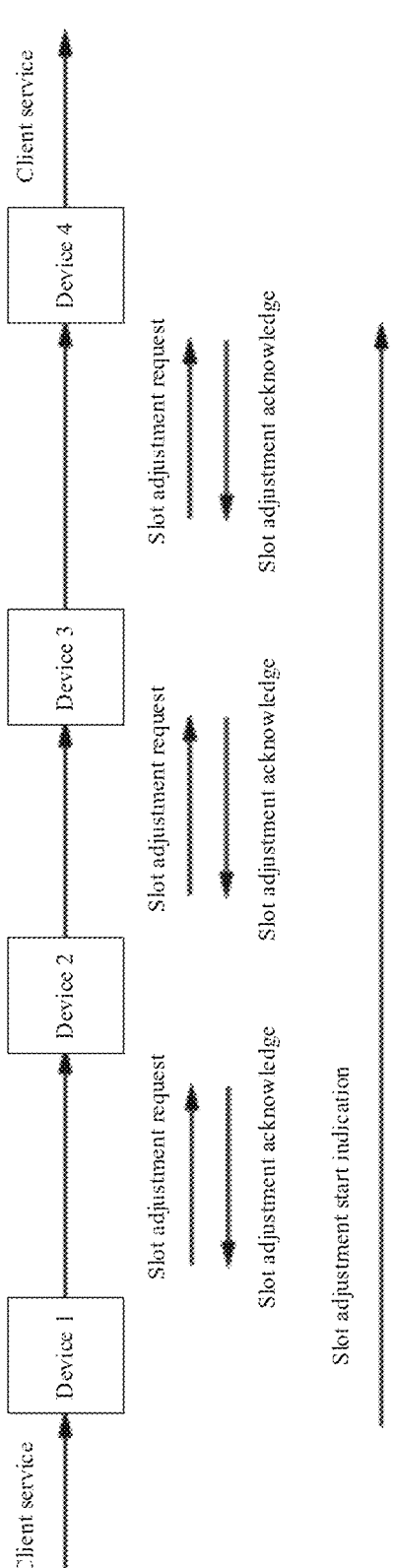
FIG. 11 is a schematic diagram illustrating a process of adjusting the number of slots between two neighboring devices according to the present application.
Figure 12:
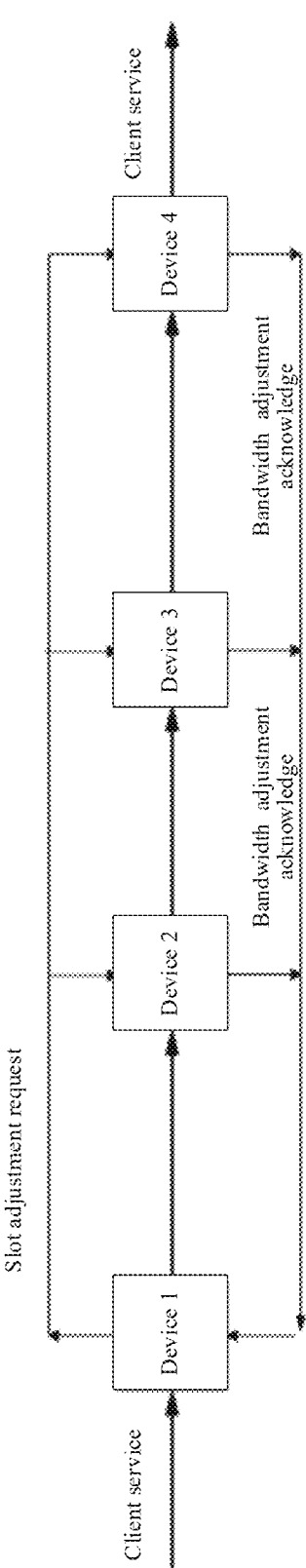
FIG. 12 is a schematic diagram illustrating a process of adjusting the number of slots between a first device and all other devices according to the present application.
Figure 13:
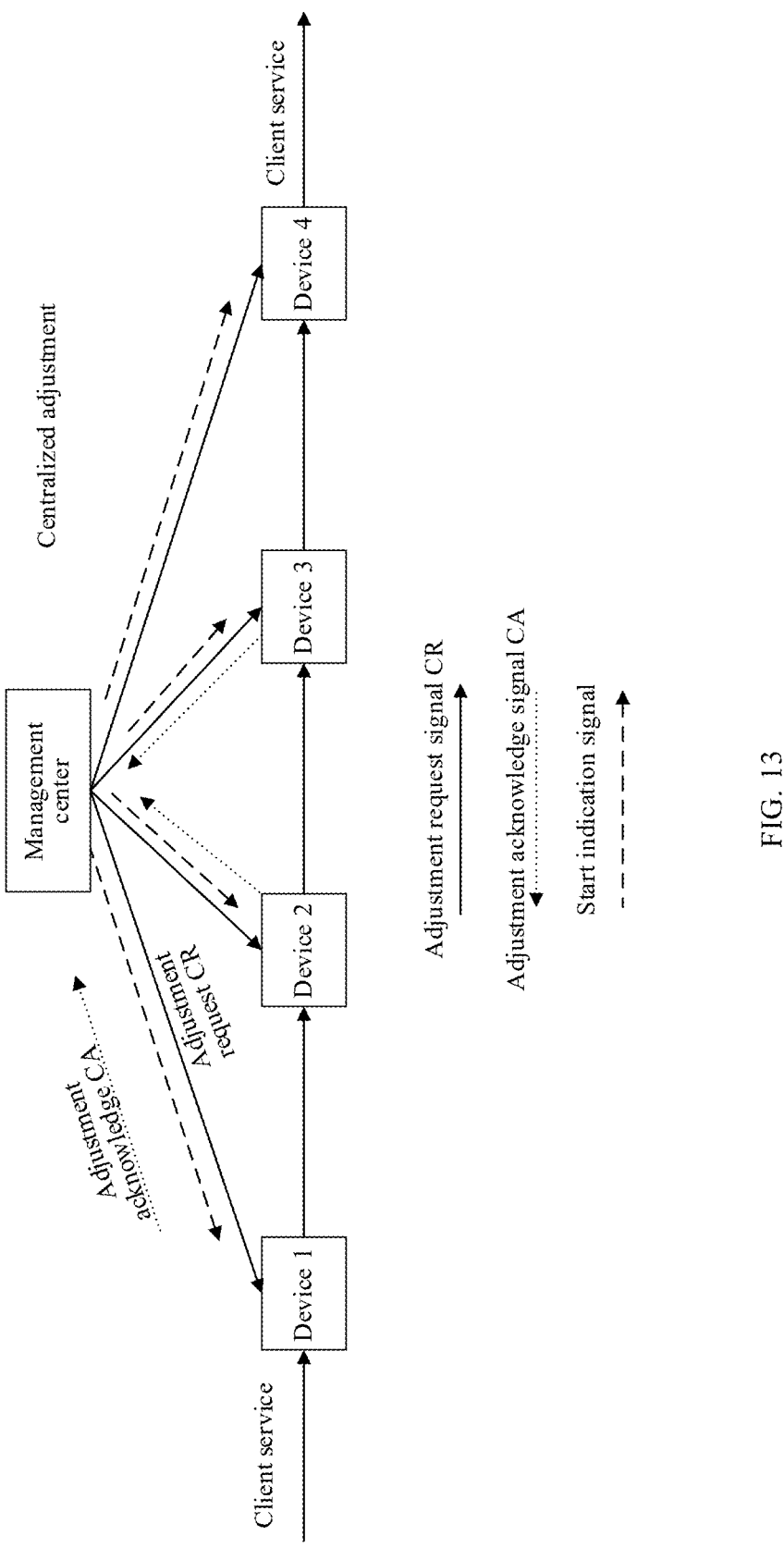
FIG. 13 is a schematic diagram illustrating a process of adjusting the number of slots between a centralized control center device and all devices according to the present application.

The following describes a process of negotiating and enabling adjusting the number of slots between two devices according to the present application with reference to FIGS. 11 to 13. FIG. 11 is a schematic diagram illustrating a process of adjusting the number of slots between two neighboring devices according to the present application.

As shown in FIG. 11, the slot adjustment process adopts a negotiation mechanism between two neighboring devices. Each of two neighboring devices in the network management communication link, for example, the device 1 and the device 2, the device 2 and the device 3, or the device 3 and the device 4 shown in FIG. 11, starts corresponding slot adjustment preparation work after receiving a slot adjustment request signal sent from a previous device, and returns, after completing the slot adjustment preparation work, a slot adjustment acknowledge signal to the previous device.

After receiving the response that all downstream devices have completed the slot adjustment preparation work, a first source device 1 (such as the device 1) sends a slot adjustment indication signal to formally start the slot addition. After the slot adjustment indication signal is received at the receiving port of each device after the first device, the slot adjustment indication signal is forwarded to a sending port and then sent to a next device of the current device.

Preparation information is negotiated between upstream and downstream neighboring devices. The preparation information includes: which slots are to be adjusted at each port of each device, adding or reducing slots, a correspondence relationship between a slot adjustment indication signal and a cell at which slot adjustment is executed. Each device completes the preparation work before adjustment in advance.

When all devices complete all preparation work, a channel associated slot adjustment indication signal is carried in a cell of a first device, and sent from the first device to a second device. When a receiving port of the second device detects the channel associated start indication signal carried in the cell, according to the cell for slot adjustment corresponding to the start indication signal, the receiving port also starts slot adjustment from the corresponding cell. While the receiving port of the second device detects the channel associated start indication signal carried in the cell, the receiving port transmits a command to a sending port of the second device which then sends the start indication signal to a third device. Also according to the cell for slot adjustment corresponding to the start indication signal, the sending port starts slot adjustment from the corresponding cell. The third device is processed in a similar manner. The slot adjustment indication signal is transferred from the first device to a last device along with the cell, and the last device starts slot adjustment after receiving the slot adjustment indication signal to complete the slot adjustment.

The operation S110 may include: receiving a slot adjustment request and a slot adjustment scheme respectively sent from a gateway center device in a centralized manner; or receiving a slot adjustment request sent from the first device in the network management path and a slot adjustment scheme sent in a centralized manner; or receiving a slot adjustment request and a slot adjustment scheme sent from a neighboring device in the network management path.

The predetermined device may send the slot adjustment request and notify the slot adjustment scheme by: sending and notifying by a gateway center in a centralized mode; sending and notifying between the first device and all other devices; or mutually sending and notifying between two devices upstream and downstream. The slot adjustment indication signal may be transferred in various manners. For example, the slot adjustment indication signal may be sent after mutual negotiation between upstream and downstream devices as described in the above embodiments, or sent from a network management center (i.e., an external centralized gateway center) after unified negotiation with all devices, or sent after centralized negotiation between the first device and all other devices in the network management path. If the centralized command mode is adopted, the network management center is desired to know actual time points of all devices, and the time precision between the devices is desired to reach the transmission time precision of one cell, which involves a very high time precision.

FIG. 12 is a schematic diagram illustrating a process of adjusting the number of slots between a first device and all other devices according to the present application. As shown in FIG. 12, in this example, when slots are to be adjusted, a first device (source device, device 1) sends a command of adjusting bandwidth (i.e., a slot adjustment request) to all downstream devices (devices 2 to 4) through a network management path. After all the downstream devices complete the preparation work of slot adjustment according to the slot adjustment request, a preparation complete acknowledge signal is returned to the first device through the network management path. After receiving the response that all downstream devices have completed the preparation work, the first device sends a slot adjustment indication signal to formally start the operation of slot adjustment.

FIG. 13 is a schematic diagram illustrating a process of adjusting the number of slots between a centralized control center device and all devices according to the present application. In the present application, the centralized control center device may also be referred to as a network management center device or a network center device. As shown in FIG. 13, in this example, when slots are to be adjusted, the network management center device may send a command of adjusting bandwidth (i.e., a slot adjustment request) to all downstream devices in a centralized mode. After all the downstream devices complete the preparation work of slot adjustment according to the slot adjustment request, a preparation complete acknowledge signal is returned to the network management center device through the network management path. After receiving the response that all downstream devices have completed the preparation work, the network management center device sends the slot adjustment indication signal to each device in a centralized mode to formally start the operation of slot adjustment.

While sending the slot adjustment request and the slot adjustment indication signal in the centralized mode, the network management center device may plan in advance a starting time of each device, and at which time or from which cell the adjustment is started on each device. The network management center device informs all devices in advance. After each device receives a notify command, the slot adjustment is started until a specific time point and a corresponding cell appears, and the adjustment is carried out according to the slot adjustment scheme to add or reduce certain slots.

Figure 14:
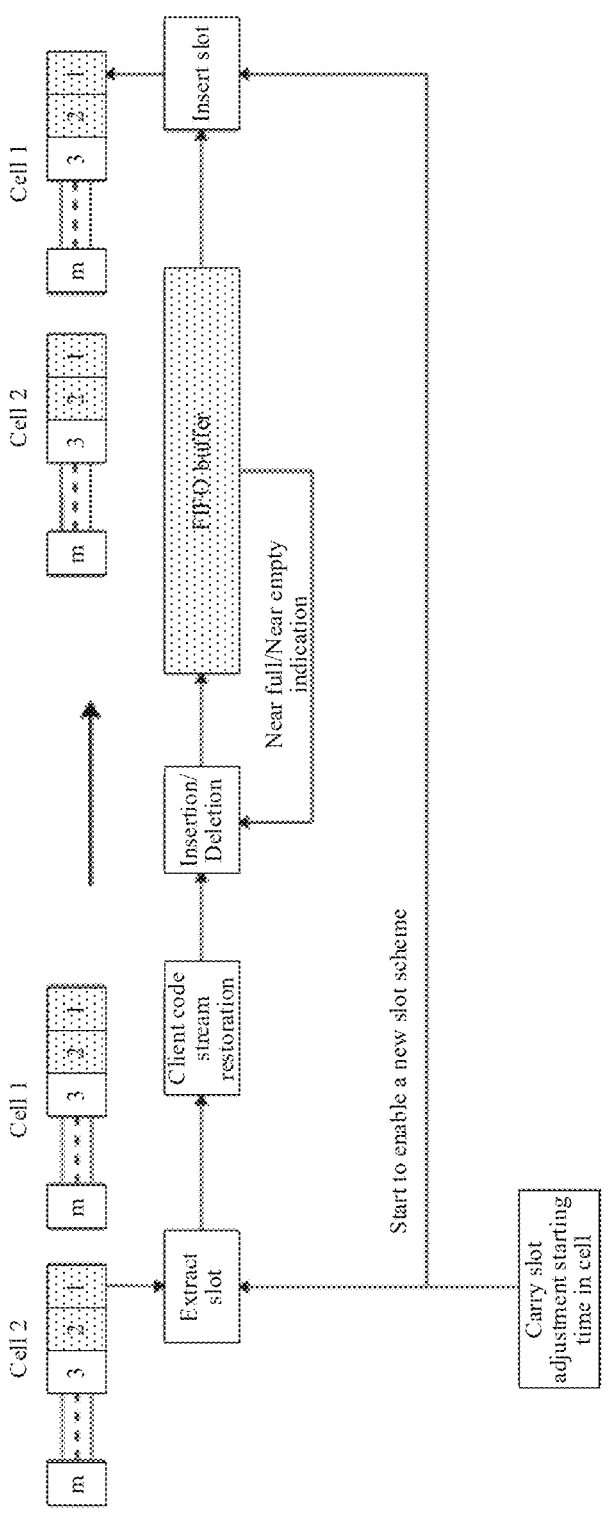
FIG. 14 is a schematic diagram illustrating service processing for performing slot adjustment on a receiving port and a sending port of a single device according to the present application.

FIG. 14 is a schematic diagram illustrating service processing for performing slot adjustment on a receiving port and a sending port of a single device according to the present application. When a slot is to be added, the slot adjustment is started from a first device (source device), and the following processing flow is executed.

The first device sends a slot adjustment indication signal for enabling slot addition, and, according to a correspondence relationship between the slot adjustment indication signal and a first cell enabling slot addition, carries a client service at a newly added slot position of a corresponding cell.

After the slot adjustment indication signal is received at a receiving port of a second device (downstream device), according to a correspondence relationship between the slot adjustment indication signal and a cell enabling slot addition (e.g., the first cell enabling slot addition) of the current device and starting from the corresponding cell, the receiving port, in addition to receiving the client service according to original slots, starts to receive the client service at the newly added slot position of the corresponding cell, and restores client information bits on all carrying slots into client coding blocks to be buffered in an FIFO buffer.

After the slot adjustment indication signal from the upstream is received at the receiving port of the second device, the slot adjustment indication signal is forwarded to a sending port of the second device. Similar to the first device, the second device starts a process of slot addition, sends a slot adjustment indication signal to a third device (a downstream device of the second device), and, according to a correspondence relationship between the slot adjustment indication signal and the first cell enabling slot addition, starts to carry a client service at a newly added slot position of a corresponding cell (the original slots continue to carry the client service).

After the slot adjustment indication signal is received at a receiving port of the third device, the receiving port starts to receive the client service at a newly added slot position of a corresponding cell and buffer the client service. Similarly, a slot adjustment indication signal is sent from a sending port of the third device to a fourth device, and, starting from a cell corresponding to the slot adjustment indication signal, the client service is carried at a newly added slot position of the corresponding cell. By analogy, until a last device receives the slot adjustment indication signal, and starts to extract client information from the newly added slot position of the corresponding cell. When the slot addition process is completed on all devices, the adjustment process of slot addition is ended.

When a slot is to be reduced, the slot adjustment is started from a first device (source device), and the following processing flow is executed.

The first device sends a slot adjustment indication signal of slot reduction, and, according to a correspondence relationship between the slot adjustment indication signal and a first cell enabling slot reduction, stops carrying any client service at the slot reduced position starting from the corresponding cell.

After the slot adjustment indication signal is received at a receiving port of a second device, according to the requirement of the slot adjustment indication signal, the receiving port stops receiving any client service at the slot reduced position starting from the corresponding cell. When the receiving port receives the slot adjustment indication signal of slot reduction from the upstream, the slot adjustment indication signal is forwarded to a sending port of the second device. The second device starts a process of slot reduction, sends a slot adjustment indication signal of slot reduction to a third device, and stops carrying any client service at the slot reduced position starting from the corresponding cell.

After the slot adjustment indication signal is received at a receiving port of the third device, the slot adjustment indication signal is forwarded to a sending port of the third device. Meanwhile, the receiving port does not extract the client service at the slot reduced position of the corresponding cell. The sending port of the third device sends slot adjustment indication information of the slot reduction to a fourth device, and meanwhile, the sending port of the third device stops carrying any client service at the slot reduced position starting from the corresponding cell.

By analogy, the fourth device completes similar work. When the slot reduction operation is completed on all devices, the adjustment process of slot reduction is formally ended.

Figure 15:
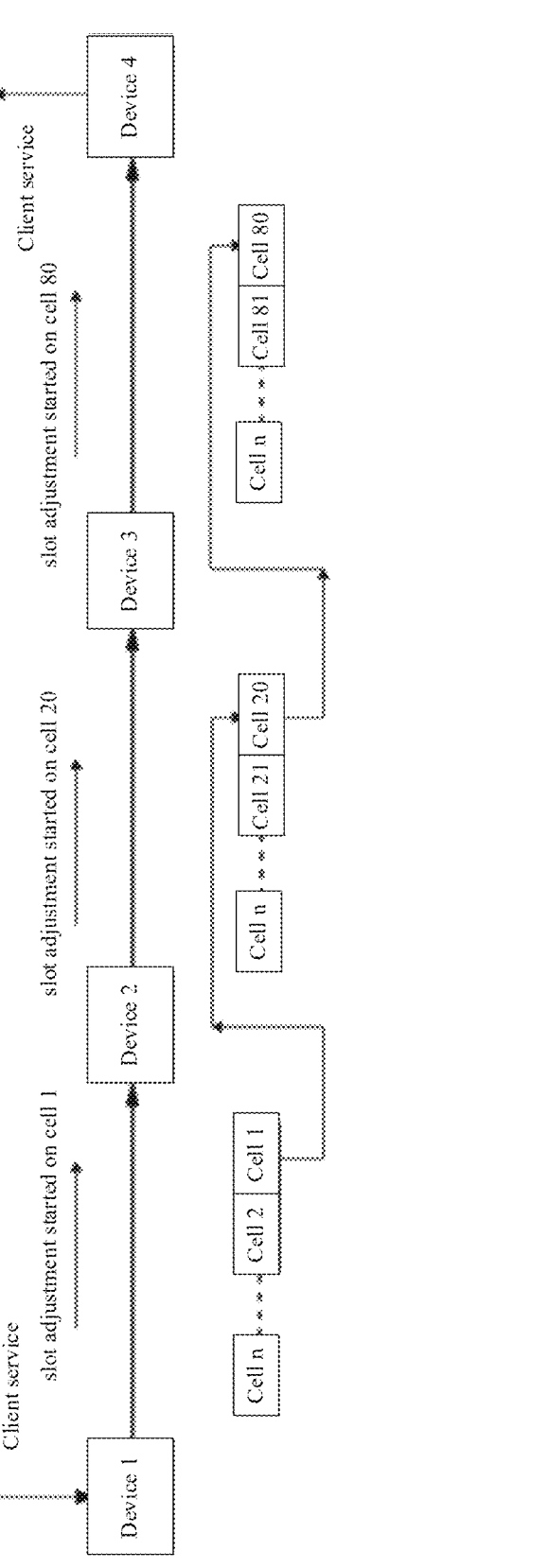
FIG. 15 is a schematic diagram of a progressive transfer process of slot adjustment in different cells at different ports in a network according to the present application.

FIG. 15 is a schematic diagram of a progressive transfer process of slot adjustment in different cells at different ports in a network according to the present application.

As shown in FIG. 15, cells at the receiving port of each device (e.g., a device 2, a device 3, and a device 4) comes from upstream, and cell numbers are determined by the upstream, cell numbers at the sending port are determined by the sending port, and the cell numbers at the sending port and the receiving port may be different at the same time. For example, a cell 1 is currently received at the receiving port while a cell 20 is currently sent at the sending port.

That is, a service carried over the cell 1 at the receiving port, if sent directly without buffering, is desired to be sent over the cell 20 at the sending port. When a slot is added to the cell 1 at the receiving port, if a slot is also added to the cell 20 at the sending port, slot adjustment is started at the receiving port and the sending port simultaneously, so that the service at the position of the newly added slot can be sent out quickly without temporary buffering, thereby reducing the service delay. At the same time, under the condition that the cell number at the receiving port of the device is not equal to the cell number at the sending port, the slot adjustment may be started at a same time point, but corresponds to different cell numbers.

As shown in FIG. 15, in the device 2, if the adjustment at the receiving port starts from the cell 1, the adjustment at the sending port starts from the cell 20. In the device 3, if the slot adjustment at the receiving port starts from the cell 20, the slot adjustment in the device 3 starts from a cell 80. In practical applications, the slot adjustment position in each device may be located on cells with different numbers.

As shown in FIG. 15, while the cell 1 is received at the receiving port of the device 2, the cell 20 is sent at the sending port, and a difference in cell number between the receiving port and the sending port is 19. When a slot is added from the cell 1 at the receiving port, if a slot is added from the cell 21 at the sending port, the time point at which slot adjustment is started at the sending port lags behind the time point at which slot adjustment is started at the receiving port starts by one cell period. In other words, when a slot is added at the receiving port, a slot is added at the sending port one cell period later, resulting in a time difference. During the time difference in slot adjustment between the sending port and the receiving port, the receiving port and the sending port have different bandwidth sizes, and a service volume due to the newly added slot is desired to be temporarily buffered, leading to an increased delay of the client service.

As the time difference in slot adjustment between the receiving port and the sending port becomes larger, the service volume to be temporarily buffered, and thus a capacity for buffering, become larger, leading to a longer time for service buffering. In practical applications, the deviation in starting slot adjustment at the receiving port and at sending port should be reduced as much as possible. When the slot adjustment is started at the receiving port, the slot adjustment should be also started at the sending port immediately, so that the adjustment operation is performed on the receiving port and the sending port of each device at the same time.

Figure 16:
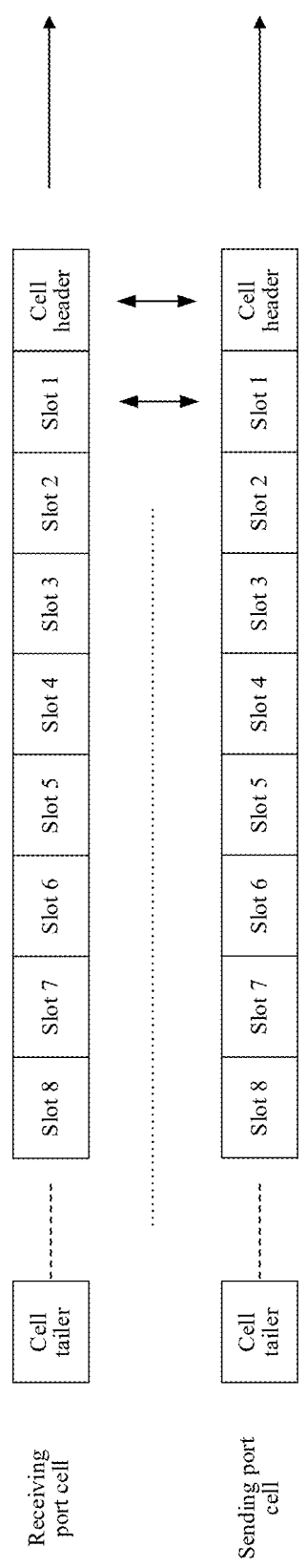
FIG. 16 is a schematic diagram of a cell phase alignment relationship between a receiving port and a sending port in a network according to the present application.
Figure 17:
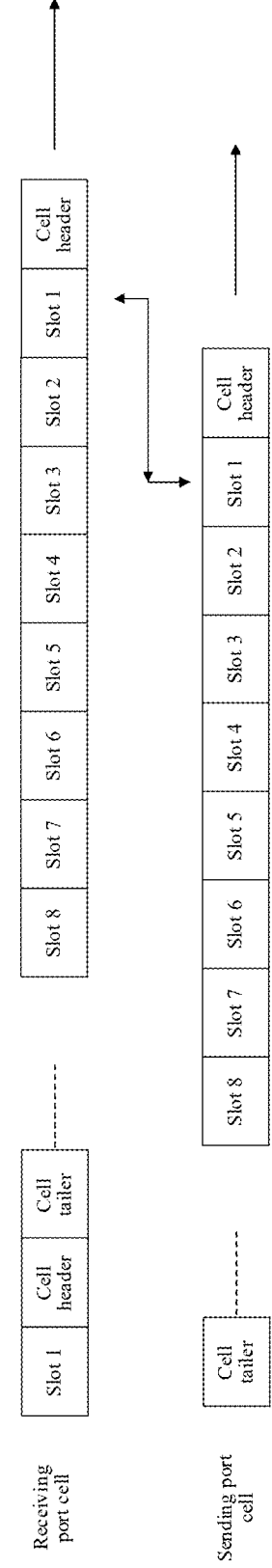
FIG. 17 is a schematic diagram of a receiving port cell having a phase advance relative to a sending port cell in a network according to the present application.
Figure 18:
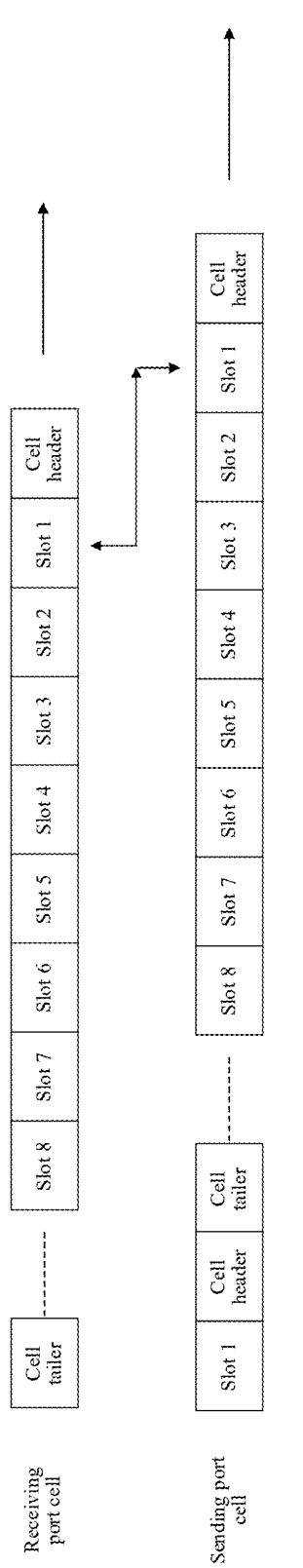
FIG. 18 is a schematic diagram of a receiving port cell having a phase lag relative to a sending port cell in a network according to the present application.

For ease of understanding, FIG. 16 is a schematic diagram of a cell phase alignment relationship between a receiving port and a sending port in a network according to the present application, FIG. 17 is a schematic diagram of a receiving port cell having a phase advance relative to a sending port cell in a network according to the present application, and FIG. 18 is a schematic diagram of a receiving port cell having a phase lag relative to a sending port cell in a network according to the present application.

As shown in FIG. 16, the cell received at the receiving port and the cell sent at the sending port are completely synchronized, i.e., when a cell header is received at the receiving port, the cell header is also sent from the sending port. When a first slot of a cell is received at the receiving port, a first slot of a cell is also sent from the sending port. Since the cell of the receiving port has an identical phase with the cell at the sending port, when slot adjustment is started at the receiving port, slot adjustment may be also started at the sending port, so that the two ports can perform slot adjustment synchronously.

In practical application scenarios, since the phase at the receiving port is not completely synchronous with the phase at the sending port, when the slot adjustment is started at the receiving port, the slot adjustment at the sending port may be not able to be started immediately, and can be started from a next cell only after transmission of the current cell is completed. For example, a slot is added at the receiving port so that a client service originally transferred over the slot 1 is now transferred over slots 1 and 2 instead. However, at this time point, the sending port has started to send a slot 7 of the cell 20, while slots 1 to 6 of the cell 20 have already sent, so the slot 2 cannot be added to the cell 20 at the sending port, but can only be added to a next cell (cell 21).

In practical applications, the slot adjustment time point at the receiving port may not be completely consistent with the slot adjustment time point in the sending direction, and there may be an adjustment time deviation that is related to a start time point of the receiving port receiving the cell, a start time point of the sending port sending the cell, and which slot is to be adjusted.

As shown in FIG. 17, when the cell of the receiving port has an asynchronous phase with the cell at the sending port, if the cell at the receiving port precedes the cell at the sending port, the cell at the receiving port appears earlier than the cell at the sending port, as shown in FIG. 17. If the slot adjustment is started in the receiving direction to adjust the slot 1, and the slot adjustment is also started in the sending direction to adjust the slot 1 which appears a certain time period later, there will be a time difference between the sending direction and the receiving direction, which is a time difference of the cell at the receiving port preceding the cell at the sending port.

As shown in FIG. 18, when the cell of the receiving port has an asynchronous phase with the cell at the sending port, if the cell at the receiving port lags behind the cell at the sending port, the cell at the receiving port appears later than the cell at the sending port, as shown in FIG. 18. If the slot adjustment is started in the receiving direction to adjust the slot 1, and the slot adjustment is also started in the sending direction. However, the slot 1 cannot be adjusted since the slot 1 of the current cell has been sent out, and the adjustment can be performed only when the slot 1 in a next cell appears, leading to a larger time difference, which is a time difference of the cell at the receiving port preceding the cell at the next sending port.

As can be seen from the above descriptions of FIGS. 16 to 18, since the cell at the receiving port and the cell at the sending port may appear at different time points in various situations, the following processing may be performed in practical applications.

After the slot adjustment indication signal is detected, the phase relationship between the cells at the receiving port and at the sending port may be not analyzed, and instead, once slot adjustment is started at the receiving port, the cell being transmitted at the sending port does not participate in the adjustment, and the slot adjustment is started from a next cell. In this manner, the time difference in slot adjustment between the receiving port and the sending port is at most a time period for transmitting one cell, and if merely one slot is adjusted in one cell at a time, the change in the client service volume brought by the time difference is the client service volume carried at one slot position. When the slot adjustment is performed in the above manner, a variation value of the client service volume during the time difference in slot adjustment is equal to the number of changed slots in the cell.

If merely one slot is adjusted, a variation value of the client service volume during the time difference in slot adjustment between the receiving port and the sending port is the client service volume carried at one slot position. If X slots are adjusted (X is an integer greater than 1), a variation value of the client service volume during the time difference in slot adjustment between the receiving port and the sending port is the client service volume carried at X slot positions. Suppose that X slots are adjusted each time, due to the time difference in the slot adjustment time point between the receiving port and the sending port, the client service volume carried at the X slot positions is changed in the time difference, which is desired to be temporarily absorbed through a buffer. For example, if X slots are adjusted each time, the client service volume at the X slots is added at the receiving port during the time difference in slot adjustment, which is desired to be buffered in a buffer for later sending from the sending port. In this manner, an extra buffer space for the client service volume of the X slots is desired.

Therefore, in the case of slot addition, slot adjustment is performed at the receiving port earlier than at the sending port, and before adjustment, each device is desired to complete preparation work in advance, so that a space for the service volume of X slots is reserved in the buffer in advance, and the preparation work is completed only after enough space is reserved in the buffer space, after which the network is allowed to formally start the operation of slot adjustment.

Similarly, for the case where slot adjustment is performed at the receiving port earlier than at the sending port, and the buffering process is just opposite in the case of slot reduction. Before adjustment, a service volume of at least X slots is reserved in the buffer space of each node device. When the slot adjustment of slot reduction is started in the receiving direction, a slot is reduced at the receiving port, and the received client service volume is also reduced. After a certain time period, the operation of slot adjustment of slot reduction is started at the sending port. Since the slot reduction is started later at the sending port, there is a time difference in which the number of slots received is smaller than the number of slots sent, and since the service volume entering the buffer is smaller than the service volume output from the buffer, the buffer tends to be empty. In order to prevent the buffer from becoming empty, a service volume of at least X slots is desired to be prepared in advance in the buffer, so that during the operation of slot adjustment of slot reduction, the preparation work is completed only after the service volume of at least X slots is reserved in the buffer space, and then the network is allowed to start the operation of slot adjustment of slot reduction.

As can be seen from the above, the slot adjustment preparation includes at least slot adjustment preparation at a buffer depth and adjustment preparation of a predetermined operation, and the operation S120 may include: determining a time deviation between a time point at which a receiving port of the current device actually executes the slot adjustment and a time point at which a sending port of the current device actually executes the slot adjustment, and determining the number of cells transferred in the time deviation (operation S121); acquiring the number of slots to be adjusted in the slot adjustment scheme, and taking a product of the number of slots to be adjusted and the number of cells transferred in the time deviation as the number of changed slots in the time deviation (operation S122); adjusting, according to a variation of a client service volume corresponding to the number of changed slots, the buffer depth of the current device to complete the adjustment preparation of the buffer depth at the current device (operation S123); completing the adjustment preparation of a predetermined operation corresponding to the slot adjustment (operation S124); and sending a slot adjustment acknowledge signal to the predetermined device to indicate that the slot adjustment preparation is completed at the current device (operation S125).

The operation S123 may include: if the time point at which the receiving port actually executes the slot adjustment is earlier than the time point at which the sending port actually executes the slot adjustment, and the addition/deletion operation type is a slot addition operation; or if the time point at which the receiving port actually executes the slot adjustment is later than the time point at which the sending port actually executes the slot adjustment, and the addition/deletion operation type is a slot deletion operation, reserving a first storage space from a buffer of the current device, where the first storage space is capable of accommodating at least a variation of the client service volume corresponding to the number of changed slots; and if a free space of the buffer is smaller than the first storage space, reserving the first storage space from the buffer of the current device by deleting an idle service code block between messages in a client service code stream.

The above embodiment describes that when the adjustment time point at the receiving port is earlier than the adjustment time point at the sending port, the preparation work of the buffer is determined according to the adjustment time deviation. As can be seen from the description of the above embodiment, in the case where slot adjustment is performed at the receiving port earlier than at the sending port, and there is a time difference in the slot adjustment time point between the receiving port and the sending port. The time difference corresponds to Y cells, where Y is an integer greater than or equal to 1. For the operation of slot adjustment of adding X slots to one cell, before the slot addition is started, a buffer free space corresponding to a client service volume of at least X*Y slots is reserved in the buffer. For the operation of slot adjustment of reducing X slots in one cell, before the slot reduction is started, a client service volume of at least X*Y slots is reserved in the buffer. The client service volume of X*Y slots or the buffer space corresponding to the client service volume of X*Y slots is a minimum requirement to be met for the buffer in the preparation work. In practical applications, since a margin is generally additionally reserved for the sake of safety, a client service volume slightly larger than that of X*Y slots or a buffer space corresponding to the client service volume of slightly more than X*Y slots is reserved. Before slot adjustment, if the buffer space does not meet the requirement, the buffer space is adjusted by adding or deleting a small number of idle information blocks at a gap position between messages in the service stream, so that the buffer space is gradually adjusted to an expected target depth, and the preparation work before adjustment is completed.

The operation S123 may include: if the time point at which the receiving port actually executes the slot adjustment is earlier than the time point at which the sending port actually executes the slot adjustment, and the addition/deletion operation type is a slot deletion operation; or if the time point at which the receiving port actually executes the slot adjustment is later than the time point at which the sending port actually executes the slot adjustment, and the addition/deletion operation type is a slot addition operation, reserving a first service volume in a buffer of the current device, where the first service volume is greater than or equal to a variation of the client service volume corresponding to the number of changed slots; and if the client service volume in the buffer is smaller than the first service volume, reserving the first service volume from the buffer of the current device by adding an idle service code block between messages in a client service code stream.

The above embodiment describes that when the adjustment time point at the receiving port is later than the adjustment time point at the sending port, the preparation work of the buffer is determined according to the adjustment time deviation. As can be seen from the description of the above embodiment, if the adjustment time point at the receiving port is later than the adjustment time point at the sending port, for the operation of slot adjustment of slot addition, since the slot adjustment of slot addition is started at the sending port before the receiving port, the buffer preparation work includes reserving the client service volume, rather than the free space, in the buffer in advance. Similarly, if the adjustment time point at the receiving port is later than the adjustment time point at the sending port, for the operation of slot adjustment of slot reduction, since the slot adjustment of slot reduction is started at the sending port before the receiving port, the buffer preparation work includes reserving enough free space, rather than the client service volume, in the buffer in advance. For the cases where the slot addition adjustment is performed at the receiving port earlier than at the sending port and where the slot reduction adjustment is performed at the receiving port later than at the sending port, the preparation work of the buffer is the same, i.e., reserving enough free space in the buffer in advance. For the cases where the slot reduction adjustment is performed at the receiving port earlier than at the sending port and where the slot addition adjustment is performed at the receiving port later than at the sending port, the preparation work of the buffer is the same, i.e., reserving enough client service volume in the buffer in advance.

The operation S130 may include: extracting, if the slot addition/deletion operation type is a slot addition operation, the client service at the slot adjustment position in the cell starting from the corresponding receiving cell according to the number of adjusted slots, and carrying the client service at the slot adjustment position in the cell starting from the corresponding sending cell (operation S131); and stopping extracting, if the slot addition/deletion operation type is a slot deletion operation, the client service at the slot adjustment position in the cell starting from the corresponding receiving cell according to the number of adjusted slots, and stopping carrying the client service at the slot adjustment position in the cell starting from the corresponding sending cell (operation S132).

In the above description of the embodiment, after the slot adjustment negotiation, all devices are notified by the start indication signal to start enabling the adjusted slot configuration, so that each device is changed from an original slot configuration to the new slot configuration. The added slot is in an unused state before the adjustment, and is in an in-use state after the adjustment. The reduced slot is in an in-use state before the adjustment, and is in an unused state after the adjustment. None of the slots has an intermediate transition state.

In other implementations, after the operation S120 and before operation S130, the method further includes: setting the current device to a slot adjustment intermediate transition stage, and carrying, at a sending port of the current device, the client service at a slot adjustment position in the cell according to a client service volume in a buffer of the current device (operation S141); extracting, at a receiving port of the current device, the client service at the receiving port of the current device according to content of the detected slot adjustment position (operation S142); and ending, in response to detecting the slot adjustment indication signal, the slot adjustment intermediate transition stage of the current device (operation S143).

In the slot adjustment intermediate transition stage, whether to carry a client service at the slot position to be adjusted may be determined according to the client service volume in the buffer of the device. If a large number of client services are buffered, the slot to be adjusted, no matter added or reduced, carries a client service. If a small number of client services are buffered, the slot to be adjusted, no matter added or reduced, does not carry a client service, and carries merely idle content. Whether the slot to be adjusted carries a client service may be determined through the content of the slot position to be adjusted, or an indication signal may be carried in the cell to indicate whether the slot position to be adjusted carries a client service.

The operation S141 may include: carrying, if the client service volume in the buffer of the current device is greater than or equal to a preset upper threshold of service volume, the client service at all slot adjustment positions in the cell; and filling, if the client service volume in the buffer of the current device is less than or equal to a preset lower threshold of service volume, idle content at all slot adjustment positions in the cell.

The operation S142 may include: discarding, if it is detected that the content of the slot adjustment position in the cell received at the receiving port of the current device is idle content, content of the slot adjustment position in the received cell; and extracting, if it is detected that the content of the slot adjustment position in the cell received at the receiving port of the current device is non-idle content, content of the slot adjustment position in the received cell, and processing the extracted content as client content.

For the sending end, after receiving the slot adjustment acknowledge signal, the sending end enters a slot adjustment intermediate transition state. According to the client service buffer depth in the current device, when less client service content is buffered, the sending end fills all the added or reduced slot positions with idle content, not carrying any client service. In other words, in a scenario of slot addition, none of the slot position to be added carries any client service, and in a scenario of slot reduction, none of the slot position to be reduced carries any client service. When a large amount of client service content is buffered, each slot position to be added or reduced carries a client service. In other words, in a scenario of slot addition, each slot position to be added carries a client service, and in a scenario of slot reduction, each slot position to be reduced carries a client service.

The method may further include: carrying, at the sending port of the current device, if each slot adjustment position in the cell is filled with idle content, a first indication signal, for indicating the slot adjustment position in an unused state in the cell, in the sent cell in a channel associated mode (operation S144); carrying, if each slot adjustment position in the cell carries a client service, a second indication signal, for indicating the slot adjustment position in an in-use state, in the sent cell in the channel associated mode (operation S145); determining, at the receiving port of the current device, if the first indication signal is detected, that the content of the slot adjustment position in the received cell is idle content (operation S146); and determining, if the second indicator signal is detected, that the content of the slot adjustment position in the received cell is non-idle content (operation S147).

For the receiving end, after entering the slot adjustment intermediate transition state, the receiving end judges whether the slot is used according to whether the slot adjustment position contains purely idle content, or may carry an indication signal in the cell to indicate whether the slot to be adjusted is used. When it is detected that the content of the position to be subjected to slot adjustment is non-idle content, or the indication signal carried in the cell indicates that the slot to be adjusted is in use, the receiving end extracts the content of the corresponding position to be subjected to slot adjustment, and takes the extracted content as client content for processing. When it is detected that the content of the position to be subjected to slot adjustment is idle content, or the indication signal carried in the cell indicates that the slot to be adjusted is not in use, the receiving end discards the content of the position to be subjected to slot adjustment, and each device returns a situation of the slot adjustment intermediate transition state. When the intermediate transition state of each device is normal, a slot adjustment enable indication signal is sent, the intermediate transition state is ended, and all devices work normally according to the state after the slot adjustment.

If it is detected that the number of client services buffered in the current device is beyond a preset carrying number interval, before setting the slot adjustment transition state of the current device, the method further includes: reserving, if the slot addition/deletion operation type is a slot addition operation, a storage space size for a client service volume corresponding to at least 1 slot in the buffer (operation S148); and reserving, if the slot addition/deletion operation type is a slot deletion operation, a client service volume corresponding to at least 1 slot in the buffer (operation S149).

In an embodiment of the present application, before entering the intermediate transition state, the buffer depth is also adjusted. For the adjustment of increasing the number of slots, a certain free space is reserved in the buffer, and the reserved free space has a size of a client service volume corresponding to at least 1 slot. For the adjustment of reducing the number of slots, a certain client service volume is reserved in the buffer, and the client service volume corresponding to at least 1 slot is reserved. After the negotiation of slot adjustment between devices is completed, the receiving port returns a slot adjustment acknowledge state and enters the slot adjustment intermediate transition state. After receiving the slot adjustment acknowledge signal, the sending port enters the slot adjustment intermediate transition state.

In the present application, the slot adjustment indication signal is transferred in a baton mode, and the slot adjustment indication signal is very important in adjustment. If one device does not detect the slot adjustment indication signal due to error codes or other reasons, the adjustment operation is interrupted on the device and cannot be continued. As result, the number of slots is not matched on upstream and downstream devices in the network, and services cannot be carried correctly. In order to avoid such situations, a certain fault-tolerant mechanism is desired for the slot adjustment indication signal, such as a transmission mode with error detection and an error correction mechanism; or multiple copies of the slot adjustment indication signal may be transferred.

The slot adjustment indication signal is a signal transferred after error detection and error correction, and/or the slot adjustment indication signal is one of a plurality of slot adjustment indication signals transferred from the predetermined device.

After the operation S130, the method further includes: feeding back a slot adjustment result to the predetermined device to indicate whether the current device has extracted and carried the client service according to slots after the slot adjustment scheme is executed (operation S150); and if the slot adjustment result fed back indicates that the current device does not execute slot adjustment, the method further includes: extracting and carrying, in response to a detected slot adjustment indication signal again, the client service according to slots after the slot adjustment scheme is executed, starting from a corresponding receiving cell and a corresponding sending cell (operation S151).

As an example, the slot adjustment indication signal may be transferred from a first device to downstream devices stage by stage, i.e., sequentially transferred from the first device, a second device, a third device, . . . , to a last device. Alternatively, the slot adjustment indication signal may be transferred from the last device to upstream devices stage by stage, i.e., sequentially transferred from the last device, a second last device, a third last device, . . . , to the first device. The two modes may be flexibly applied in practical applications, and the specific mode is determined according to the specific scenario.

After the bandwidth adjustment on the current device is completed, the method further includes: sending a notification message for feeding back a slot adjustment result to a first device on a client service communication link. If the current device does not carry the client service according to the adjusted slot, the method further includes: re-executing the preset slot adjustment from the determined cell at which the slot adjustment is started to be executed, and carrying the client service according to the adjusted slot to complete the bandwidth adjustment on the current device.

In this embodiment, each device reports an adjustment result to the first device after the adjustment is completed, and if there is any device that has not been adjusted, the operation of slot adjustment is restarted until all devices have been adjusted correctly. In this manner, the case that the adjustment operation cannot be continued due to interruption on the current device, causing the number of slots not matched on upstream and downstream devices in the network and services failing to be carried correctly is avoided, thereby ensuring that the slot adjustment is successfully performed on each device.

In practical applications, each cell may carry all slots, and all cells has an identical slot structure. However, in the case of many slots, the cell may be very large. To reduce the length of each cell, merely some of the slots may be carried in one cell, and a plurality of cells form a cell multi-frame to transfer all the slots.

If the cell in the current device has a cell multi-frame structure, and the cell where the current device starts the slot adjustment has a designated cell number, the operation S130 may include: extracting, at the receiving port of the current device, starting from the corresponding receiving cell or starting from a designated cell in one or more cell multi-frame periods following a current cell multi-frame period, the client service according to slots after the slot adjustment scheme is executed (operation S21); and carrying, at the sending port of the current device, starting from the corresponding sending cell or starting from a designated cell in one or more cell multi-frame periods following a current cell multi-frame period, the client service according to slots after the slot adjustment scheme is executed (operation S22).

If the slot adjustment indication signal is a signal sent from a neighboring device in the network management path, after the operation S130, the method further includes: sending a slot adjustment indication signal to a next neighboring device in the network management path.

Figure 19:
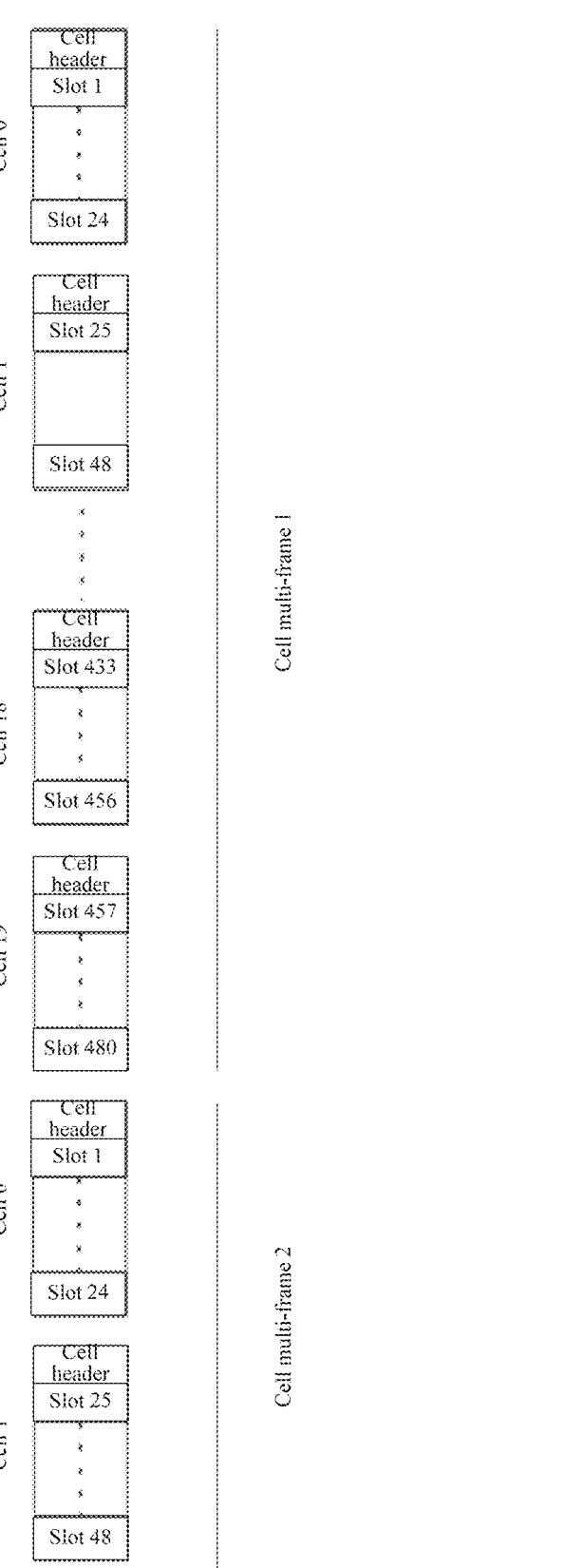
FIG. 19 is a schematic diagram of a cell multi-frame structure according to the present application.

FIG. 19 is a schematic diagram of a cell multi-frame structure according to the present application. In FIG. 19, a cell multi-frame may be regarded as a large cell. As shown in FIG. 19, 20 cells, each carrying 24 slots, form a cell multi-frame. In the cell multi-frame formed by the 20 cells, the cells are numbered with 0, 1, . . . 19 (i.e., the cell numbers range from 0 to 19); or 1, 2, . . . 20 (i.e., the cell numbers range from 1 to 20). The 20 cells together carry 480 slots.

Figure 20:
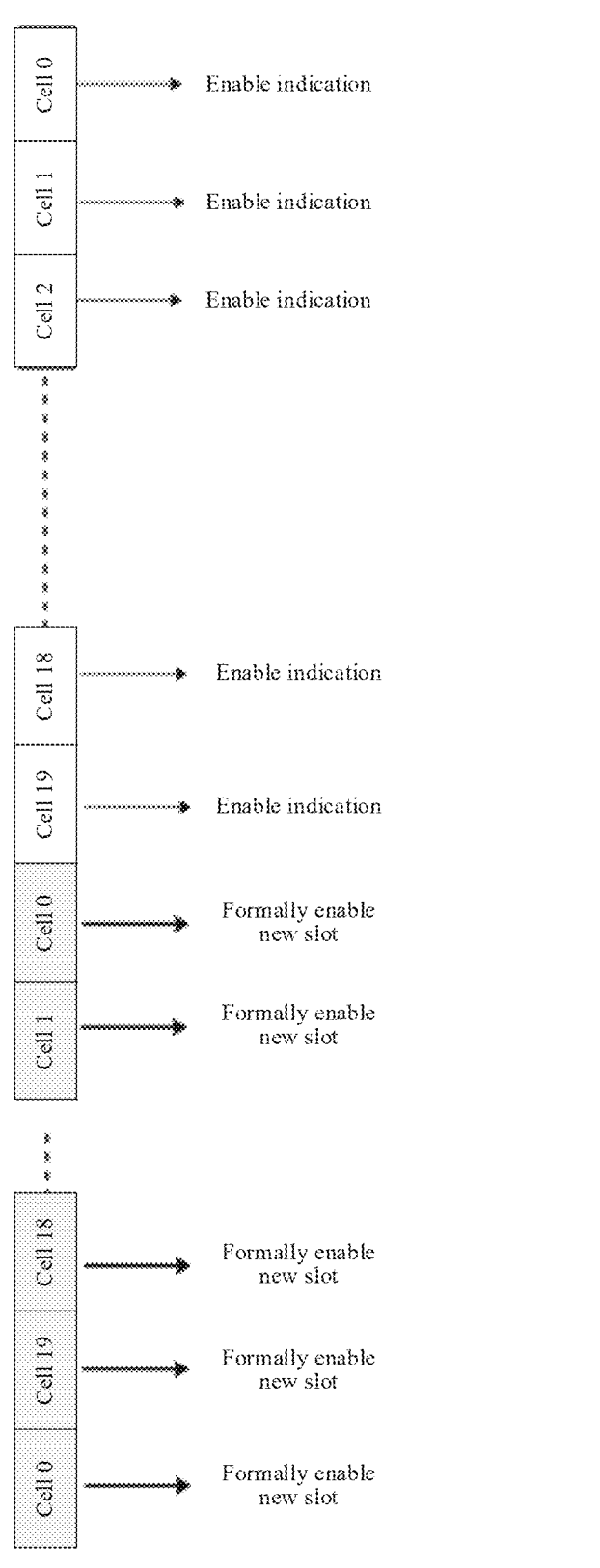
FIG. 20 is a schematic diagram illustrating a transfer process of a slot adjustment indication signal according to the present application.

FIG. 20 is a schematic diagram illustrating a transfer process of a slot adjustment indication signal according to the present application.

As shown in FIG. 20, as a method for transferring multiple copies of a slot adjustment indication signal, the slot adjustment indication signal is transferred in 20 consecutive cells of a cell multi-frame. After negotiation between an upstream device and a downstream device, the adjustment is started from cell 0 in a next cell multi-frame, but the slot adjustment indication signal is transferred from cell 0 in a previous cell multi-frame. The upstream device informs the downstream device to prepare for slot adjustment, the slot adjustment indication signal is continuously transferred from the first cell to the twentieth cell from the upstream device to the downstream device, and each cell in the cell multi-frame transfers the slot adjustment indication signal. In this manner, even if the channel associated slot adjustment indication signal carried by a cell is lost due to error codes or other reasons, as long as the channel associated slot adjustment indication signal carried by any cell is correctly received, the slot adjustment indication signal can be correctly transferred to the next device at an appointed time point, and in turn to the last device. In applications, the slot adjustment indication signal may be transferred from cell 0, and the slot adjustment indication signal may be transferred over all cells, but the operation of slot adjustment may be started from cell 0 in a next cell multi-frame period, that is, the slot adjustment indication signal may be given one cell multi-frame period ahead.

As can be seen from the above description, if the cell received at the receiving port of the current device is a cell having a designated number in a cell multi-frame, and one cell multi-frame contains a plurality of consecutive cells, the preset slot adjustment may be executed from the cell having the designated number in the next cell multi-frame period.

In the present application, before slot adjustment, a device in the network management communication link may complete the preparation work of slot adjustment at the current device according to the received slot adjustment request, and return an acknowledge signal; send, after receiving the slot adjustment indication signal from a previous device, the slot adjustment indication signal to a next device; and send/ extract, after the device receives or sends the slot adjustment indication signal, the client service from a corresponding cell according to the adjusted slot.

The following describes a bandwidth adjustment apparatus according to the present application in detail with reference to the accompanying drawings. FIG. 21 is a schematic structural diagram of a bandwidth adjustment apparatus according to the present application. As shown in FIG. 21, the bandwidth adjustment apparatus of the present application may include a slot adjustment request module 210, a slot adjustment preparation module 220, and a slot adjustment execution module 230.

The slot adjustment request module 210 is configured to receive a slot adjustment request sent from a predetermined device, and acquire a slot adjustment scheme notified by the predetermined device.

The slot adjustment preparation module 220 is configured to complete slot adjustment preparation on a current device according to the slot adjustment scheme, and send a slot adjustment acknowledge signal to the predetermined device.

The slot adjustment execution module 230 is configured to extract and carry, in response to detecting a slot adjustment indication signal sent from the predetermined device, a client service according to slots after the slot adjustment scheme is executed, starting from a corresponding receiving cell and a corresponding sending cell.

The slot adjustment request module 210 may be configured to: receive a slot adjustment request and a slot adjustment scheme which are transmitted in a centralized manner by gateway center device; or receive a slot adjustment request sent from the first device in the network management path and a slot adjustment scheme sent in a centralized manner; or receive a slot adjustment request and a slot adjustment scheme sent from a neighboring device in a network management path. The slot adjustment scheme includes at least one of: the number of slots to be adjusted, an addition/deletion operation type, a slot adjustment position in a cell, an order of slot adjustment at a receiving end and a sending end, and a correspondence relationship between a slot adjustment indication signal and a cell at which the current device starts to execute slot adjustment.

The slot adjustment preparation includes at least slot adjustment preparation at a buffer depth and adjustment preparation of a predetermined operation, and the slot adjustment preparation module 220 may include: a time deviation and cell number determining unit configured to determine a time deviation between a time point at which a receiving port of the current device actually executes the slot adjustment and a time point at which a sending port of the current device actually executes the slot adjustment, and determine the number of cells transferred in the time deviation; a slot number variation determining unit configured to acquire the number of slots to be adjusted in the slot adjustment scheme, and take a product of the number of slots to be adjusted and the number of cells transferred in the time deviation as the number of changed slots in the time deviation; a buffer depth adjusting unit configured to adjust, according to a variation of a client service volume corresponding to the number of changed slots, the buffer depth of the current device to complete the adjustment preparation of the buffer depth at the current device; an operation process adjustment preparation unit configured to complete the adjustment preparation of a predetermined operation corresponding to the slot adjustment; and a slot adjustment acknowledge unit configured to send a slot adjustment acknowledge signal to the predetermined device to indicate that the slot adjustment preparation is completed at the current device.

The buffer depth adjusting unit may be configured to: if the time point at which the receiving port actually executes the slot adjustment is earlier than the time point at which the sending port actually executes the slot adjustment, and the addition/deletion operation type is a slot addition operation; or if the time point at which the receiving port actually executes the slot adjustment is later than the time point at which the sending port actually executes the slot adjustment, and the addition/deletion operation type is a slot deletion operation, reserve a first storage space from a buffer of the current device, where the first storage space is capable of accommodating at least a variation of the client service volume corresponding to the number of changed slots; and if a free space of the buffer is smaller than the first storage space, reserve the first storage space from the buffer of the current device by deleting an idle service code block between messages in a client service code stream.

The buffer depth adjusting unit may be configured to: if the time point at which the receiving port actually executes the slot adjustment is earlier than the time point at which the sending port actually executes the slot adjustment, and the addition/deletion operation type is a slot deletion operation; or if the time point at which the receiving port actually executes the slot adjustment is later than the time point at which the sending port actually executes the slot adjustment, and the addition/deletion operation type is a slot addition operation, reserve a first service volume in a buffer of the current device, where the first service volume is greater than or equal to a variation of the client service volume corresponding to the number of changed slots; and if the client service volume in the buffer is smaller than the first service volume, reserve the first service volume from the buffer of the current device by adding an idle service code block between messages in a client service code stream.

If the corresponding receiving cell and the corresponding sending cell have designated cell numbers, the number of cells transferred in the time deviation is the number of cells transferred in a time deviation from a first actual time point to a second actual time point. The first actual time point is a time point after the receiving port receives the slot adjustment indication signal and starting from a corresponding cell with a designated cell number, at which the slot adjustment is actually executed, and the second actual time point is a time point after the sending port receives the slot adjustment indication signal and starting from a corresponding cell with a designated cell number, at which the slot adjustment is actually executed.

If the time point at which the slot adjustment is actually executed at the sending port starts at a next cell of a currently processed cell while the slot adjustment is actually executed at the receiving port of the current device, or if the time point at which the slot adjustment is actually executed at the receiving port starts at a next cell of a currently processed cell while the slot adjustment is actually executed at the sending port of the current device, the number of cells transferred in the time deviation is 1.

The slot adjustment indication signal may be an indication signal that is transferred in one or more cells in a channel associated mode and has a preset number of bits, a combination of commands transferred in the channel associated mode, or a signal identified by content change information of a slot position. If the slot adjustment indication signal is a signal identified by content change information of the slot position, the slot adjustment execution module 230 may be further configured to: determine, if it is detected that slots in the received cell are increased and content information of a slot increased position has a first predetermined change, or slots in the received cell are decreased and content information of a slot decreased position has a second predetermined change, the slot adjustment indication signal is detected. The first predetermined change includes the content information of the slot increased position changing from idle content to non-idle content, and the second predetermined change includes the content information of the slot decreased position changing from non-idle content to idle content. If the detected cell state indication information carried in a cell indicates that no client service is carried in the current cell, the content information of the slot increased position is determined as idle content, and if the detected cell state indication information carried in a cell indicates that a client service is carried in the current cell, the content information of the slot increased position is determined as non-idle content.

The bandwidth adjustment apparatus may further include: a transition state setting module configured to, after the slot adjustment preparation on the current device is completed and before the slot adjustment indication signal is detected, set the current device to a slot adjustment intermediate transition stage; a sending end transition stage processing module configured to carry, at a sending port of the current device, a client service at a slot adjustment position in the cell according to a client service volume in a buffer of the current device; and a receiving end transition stage processing module configured to extract, at a receiving port of the current device, the client service at the receiving port of the current device according to content of the detected slot adjustment position or the cell state indication information carried in the cell. The transition state setting module is further configured to end, in response to detecting the slot adjustment indication signal, the slot adjustment intermediate transition stage of the current device.

The sending end transition stage processing module is configured to: carry, if the client service volume in the buffer of the current device is greater than or equal to a preset upper threshold of service volume, client services at all slot adjustment positions in the cell; and fill, if the client service volume in the buffer of the current device is less than or equal to a preset lower threshold of service volume, idle content at all slot adjustment positions in the cell.

The receiving end transition stage processing module is configured to: discard, if it is detected that the content of the slot adjustment position in the cell received at the receiving port of the current device is idle content or the cell state indication information carried in the cell indicates that no client service is carried in the current cell, content of the slot adjustment position in the received cell; and extract, if it is detected that the content of the slot adjustment position in the cell received at the receiving port of the current device is non-idle content or the cell state indication information carried in the cell indicates that a client service is carried in the current cell, content of the slot adjustment position in the received cell, and process the extracted content as client content.

The sending end transition stage processing module may be further configured to: carry, at the sending port of the current device, if each slot adjustment position in the cell is filled with idle content, a first indication signal, for indicating the slot adjustment position in an unused state in the cell, in the sent cell in a channel associated mode; carry, if each slot adjustment position in the cell carries a client service, a second indication signal, for indicating the slot adjustment position in an in-use state, in the sent cell in the channel associated mode.

The receiving end transition stage processing module may be further configured to: determine, at the receiving port of the current device, if the first indication signal is detected, that the content of the slot adjustment position in the received cell is idle content; determine, if the second indicator signal is detected, that the content of the slot adjustment position in the received cell is non-idle content.

The bandwidth adjustment apparatus may further include: a transition stage buffer adjusting module configured to, before setting the current device to the slot adjustment intermediate transition stage, reserve, if the slot addition/deletion operation type is a slot addition operation, a storage space size for a client service volume corresponding to at least 1 slot in the buffer; and reserve, if the slot addition/deletion operation type is a slot deletion operation, a client service volume corresponding to at least 1 slot in the buffer.

The slot adjustment indication signal is a signal transferred after error detection and error correction, and/or the slot adjustment indication signal is one of a plurality of slot adjustment indication signals transferred from the predetermined device.

The bandwidth adjustment apparatus may further include: a slot adjustment result feedback module configured to feed back a slot adjustment result to the predetermined device to indicate whether the current device has extracted and carried the client service according to slots after the slot adjustment scheme is executed, and if the slot adjustment result fed back indicates that the current device does not execute slot adjustment, extract and carry, in response to a detected slot adjustment indication signal again, the client service according to slots after the slot adjustment scheme is executed, starting from a corresponding receiving cell and a corresponding sending cell.

The slot adjustment execution module 230 may be configured to: extract, if the slot addition/deletion operation type is a slot addition operation, the client service at the slot adjustment position in the cell starting from the corresponding receiving cell according to the number of adjusted slots, and carry the client service at the slot adjustment position in the cell starting from the corresponding sending cell; and stop extracting, if the slot addition/deletion operation type is a slot deletion operation, the client service at the slot adjustment position in the cell starting from the corresponding receiving cell according to the number of adjusted slots, and stop carrying the client service at the slot adjustment position in the cell starting from the corresponding sending cell.

If the cell in the current device has a cell multi-frame structure, and the cell where the current device starts the slot adjustment has a designated cell number, the slot adjustment execution module 230 may be further configured to: extract, at the receiving port of the current device, starting from the corresponding receiving cell or starting from a designated cell in one or more cell multi-frame periods following a current cell multi-frame period, the client service according to slots after the slot adjustment scheme is executed; and carry, at the sending port of the current device, starting from the corresponding sending cell or starting from a designated cell in one or more cell multi-frame periods following a current cell multi-frame period, the client service according to slots after the slot adjustment scheme is executed. The designated cell is a first cell or any cell after the first cell in a multi-frame period.

If the slot adjustment indication signal is a signal sent from a neighboring device in the network management path, the bandwidth adjustment apparatus may further include: a slot adjustment indication signal forwarding module configured to send, after detecting the slot adjustment indication signal sent from the predetermined device, a slot adjustment indication signal to a next neighboring device in the network management path.

According to the bandwidth adjustment apparatus of the present application, after receiving the slot adjustment request sent from the predetermined device and acquiring the slot adjustment scheme sent from the predetermined device, the preparation work of slot adjustment at the current device may be completed and an acknowledge signal may be returned, and when a slot adjustment indication signal is received, the client service is sent and extracted from the corresponding cell according to the adjusted slot, so that the bandwidth adjustment for carrying client service information is completed at the current device.

It should be noted that the present application is not limited to the specific configurations and processing described in the above embodiments and shown in the figures. For convenience and simplicity of description, detailed description of a known method is omitted here, and for the specific working processes of the system, the modules and the units described above, reference may be made to corresponding processes in the foregoing method embodiments, which are not repeated here.

FIG. 22 is a schematic flowchart of a service transmission method according to the present application. As shown in FIG. 22, the service transmission method may include operations S310 to S320.

At operation S310, receiving a slot adjustment request sent from a predetermined device, and acquiring a slot adjustment scheme notified by the predetermined device; completing slot adjustment preparation on a current device according to the slot adjustment scheme, and sending a slot adjustment acknowledge signal to the predetermined device; and extracting and carrying, in response to detecting a slot adjustment indication signal sent from the predetermined device, a client service according to slots after the slot adjustment scheme is executed, starting from a corresponding receiving cell and a corresponding sending cell.

At operation S320, sending a client service in the current device according to the adjusted slots in the receiving cell and the sending cell.

The service transmission method according to the embodiment of the present application may execute any bandwidth adjustment method described above with reference to FIGS. 1 to 21, to obtain the adjusted bandwidth of the current device.

According to the service transmission method of the present application, in the service transmission process, a slot adjustment indication signal from a previous device is detected at a receiving port of a current device, and according to the bandwidth adjustment method in the above embodiment, the slot adjustment indication signal sent from the previous device and detected at the receiving port of the current device is transferred to a sending port, and then sent to a next device, so that according to a preset correspondence relationship between a slot adjustment indication signal and a cell at which the current device starts slot adjustment, slot adjustment is performed at the current device according to a preset slot adjustment content from the corresponding cell, thereby completing the bandwidth adjustment for carrying client service information on the current device.

FIG. 23 is a schematic flowchart of a service transmission apparatus according to the present application. As shown in FIG. 23, the service transmission apparatus may include: a bandwidth adjusting module 410 configured to execute any bandwidth adjustment method of the present application described with reference to FIGS. 1 to 21, to adjust slots in a receiving cell and a sending cell of the current device; and a service transmission module 420 configured to send a client service in the current device according to the adjusted slots in the receiving cell and the sending cell.

According to the service transmission apparatus of the present application, in the service transmission process, a slot adjustment indication signal from a previous device may be detected at a receiving port of a current device, and then sent to a next device from a sending port of the current device, so that according to a preset correspondence relationship between a slot adjustment indication signal and a cell at which the current device starts slot adjustment, slot adjustment is performed at the current device according to a preset slot adjustment content from the corresponding cell, thereby completing the bandwidth adjustment for carrying client service information on the current device.

Figure 24:
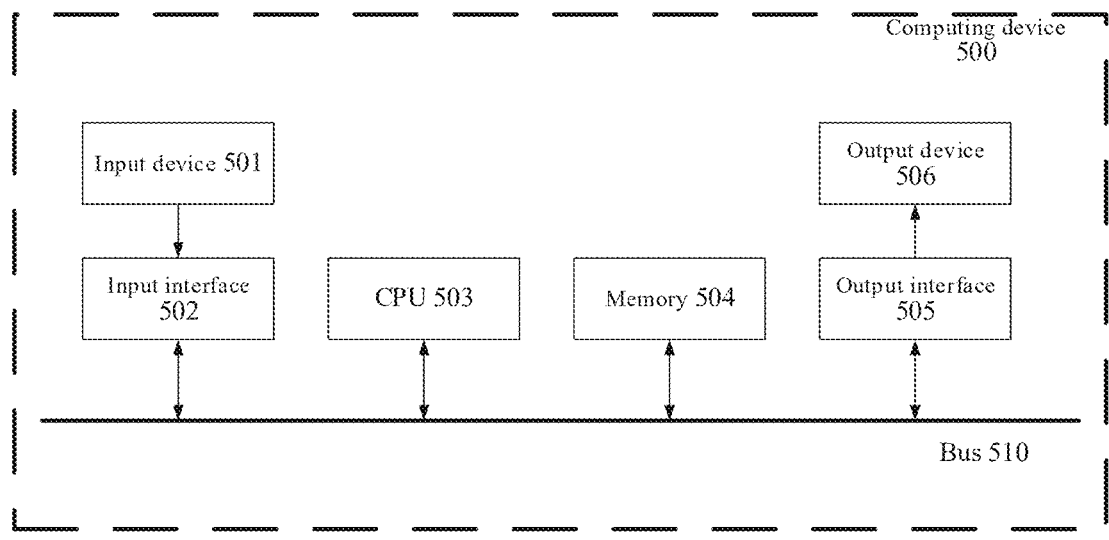
FIG. 24 is a block diagram of an exemplary hardware architecture of a computing device capable of implementing the bandwidth adjustment method and apparatus according to the present application.

FIG. 24 is a block diagram of an exemplary hardware architecture of a computing device capable of implementing the bandwidth adjustment method and apparatus according to the present application.

As shown in FIG. 24, the computing device 500 includes an input device 501, an input interface 502, a central processing unit 503, a memory 504, an output interface 505, and an output device 506. The input interface 502, the central processing unit 503, the memory 504, and the output interface 505 are connected to each other via a bus 510, and the input device 501 and the output device 506 are connected to the bus 510 via the input interface 502 and the output interface 505, respectively, and further connected to other components of the computing device 500.

The input device 501 receives input information from the outside, and transmits the input information to the central processing unit 503 through the input interface 502. The central processing unit 503 processes the input information based on computer-executable instructions stored in the memory 504 to generate output information, stores the output information temporarily or permanently in the memory 504, and then transmits the output information to the output device 506 through the output interface 505. The output device 506 outputs output information outside of the computing device 500 for use by a user.

The computing device shown in FIG. 24 may be implemented as a network device, which may include: a memory configured to store a program; and a processor configured to execute the program stored in the memory to execute the bandwidth adjustment method or the service transmission method described in the above embodiments.

The above are only exemplary embodiments of the present application and not intended to limit the scope of the present application. In general, the various embodiments of the present application may be implemented in hardware or special purpose circuits, software, logic or any combination thereof. For example, some aspects may be implemented in hardware, while other aspects may be implemented in firmware or software which may be executed by a controller, a microprocessor or any other computing device, although the present application is not limited thereto.

Embodiments of the present application may be implemented by a data processor of a mobile device executing computer program instructions, for example, in a processor entity, or by hardware, or by a combination of software and hardware. The computer program instructions may be assembler instructions, instruction set architecture (ISA) instructions, machine instructions, machine-related instructions, microcodes, firmware instructions, state setting data, or source or object codes written in any combination of one or more programming languages.

The block diagrams of any logic flow in the figures of the present application may represent program operations, or may represent interconnected logic circuits, modules, and functions, or may represent a combination of program operations and logic circuits, modules, and functions. The computer program may be stored on a memory. The memory may be of any type suitable to the local technical environment and may be implemented in any suitable data storage technology, such as but not limited to, read only memories (ROMs), random access memories (RAMs), optical storage devices or systems (digital versatile discs (DVDs), compact discs (CDs)), etc. The computer-readable medium may include a non-transitory storage medium. The data processor may be of any type suitable to the local technical environment, such as but not limited to, general purpose computers, dedicated computers, microprocessors, digital signal processors (DSPs), application specific integrated circuits (ASICs), field programmable gate arrays (FGPAs), and processors based on multi-core processor architecture.

The foregoing has provided by way of exemplary and non-limiting examples a detailed description of exemplary embodiments of the present application. Various modifications and adaptations to the foregoing embodiments may become apparent to those skilled in the art in view of the accompanying drawings and the appended claims, without departing from the scope of the present application. Accordingly, the proper scope of the present application is to be determined according to the claims.

What is claimed is:

1. A bandwidth adjustment method, comprising:
receiving a slot adjustment request sent from a predetermined device, and acquiring a slot adjustment scheme notified by the predetermined device;
completing slot adjustment preparation on a current device according to the slot adjustment scheme, and sending a slot adjustment acknowledge signal to the predetermined device; and
extracting and carrying, in response to detecting a slot adjustment indication signal sent from the predetermined device, a client service according to slots after the slot adjustment scheme is executed, starting from a corresponding receiving cell and a corresponding sending cell,
wherein the slot adjustment preparation comprises at least slot adjustment preparation at a buffer depth, and the operation of completing the slot adjustment preparation on the current device according to the slot adjustment scheme comprises:
determining a time deviation between a time point at which a receiving port of the current device actually executes the slot adjustment and a time point at which a sending port of the current device actually executes the slot adjustment, and determining a number of cells transferred in the time deviation;
acquiring the number of slots to be adjusted in the slot adjustment scheme, and taking a product of the number of slots to be adjusted and the number of cells transferred in the time deviation as the number of changed slots in the time deviation;
adjusting, according to a variation of a client service volume corresponding to the number of changed slots, the buffer depth of the current device to complete the adjustment preparation of the buffer depth at the current device.

2. The method according to claim 1, wherein the operation of receiving the slot adjustment request sent from the predetermined device, and acquiring the slot adjustment scheme notified by the predetermined device comprises:
receiving the slot adjustment request and the slot adjustment scheme respectively sent from a gateway center device in a centralized manner; or
receiving the slot adjustment request sent from a first device in a network management path and the slot adjustment scheme sent in a centralized manner; or
receiving the slot adjustment request and the slot adjustment scheme sent from a neighboring device in a network management path; and
wherein the slot adjustment scheme comprises at least one of: the number of slots to be adjusted, an addition/deletion operation type, a slot adjustment position in a cell, an order of slot adjustment at a receiving end and a sending end, and a correspondence relationship between a slot adjustment indication signal and a cell at which the current device starts to execute slot adjustment.

3. The method according to claim 1, wherein the slot adjustment preparation further comprises adjustment preparation of a predetermined operation, and the operation of completing the slot adjustment preparation on the current device according to the slot adjustment scheme, and sending the slot adjustment acknowledge signal to the predetermined device further comprises:
completing the adjustment preparation of the predetermined operation corresponding to the slot adjustment; and
sending a slot adjustment acknowledge signal to the predetermined device to indicate that the slot adjustment preparation is completed at the current device.

4. The method according to claim 1, wherein the slot adjustment scheme comprises the number of slots to be adjusted and an addition/deletion operation type, and the operation of adjusting, according to the variation of the client service volume corresponding to the number of changed slots, the buffer depth of the current device comprises:

if the time point at which the receiving port actually executes the slot adjustment is earlier than the time point at which the sending port actually executes the slot adjustment, and the addition/deletion operation type is a slot addition operation; or if the time point at which the receiving port actually executes the slot adjustment is later than the time point at which the sending port actually executes the slot adjustment, and the addition/deletion operation type is a slot deletion operation, reserving a first storage space from a buffer of the current device, wherein the first storage space is capable of accommodating at least the variation of the client service volume corresponding to the number of changed slots; and if a free space of the buffer is smaller than the first storage space, reserving the first storage space from the buffer of the current device by deleting an idle service code block between messages in a client service code stream.

5. The method according to claim 1, wherein the slot adjustment scheme comprises the number of slots to be adjusted and an addition/deletion operation type, and the operation of adjusting, according to the variation of the client service volume corresponding to the number of changed slots, the buffer depth of the current device comprises:

if the time point at which the receiving port actually executes the slot adjustment is earlier than the time point at which the sending port actually executes the slot adjustment, and the addition/deletion operation type is a slot deletion operation; or if the time point at which the receiving port actually executes the slot adjustment is later than the time point at which the sending port actually executes the slot adjustment, and the addition/deletion operation type is a slot addition operation, reserving a first service volume in a buffer of the current device, wherein the first service volume is greater than or equal to the variation of the client service volume corresponding to the number of changed slots; and if the client service volume in the buffer is smaller than the first service volume, reserving the first service volume from the buffer of the current device by adding an idle service code block between messages in a client service code stream.

6. The method according to claim 1, wherein the operation of determining the number of cells transferred in the time deviation comprises:

determining, if the corresponding receiving cell and the corresponding sending cell have designated cell numbers, that the number of cells transferred in the time deviation is the number of cells transferred in a time deviation from a first actual time point to a second actual time point, wherein the first actual time point is a time point after the receiving port receives the slot adjustment indication signal and starting from a corresponding cell with a designated cell number, at which the slot adjustment is actually executed, and the second actual time point is a time point after the sending port receives the slot adjustment indication signal and starting from a corresponding cell with a designated cell number, at which the slot adjustment is actually executed; and determining, if the time point at which the slot adjustment is actually executed at the sending port starts at a next cell of a currently processed cell while the slot adjustment is actually executed at the receiving port of the current device, or if the time point at which the slot adjustment is actually executed at the receiving port starts at a next cell of a currently processed cell while the slot adjustment is actually executed at the sending port of the current device, that the number of cells transferred in the time deviation is 1.

7. The method according to claim 1, wherein the slot adjustment indication signal is an indication signal that is transferred in one or more cells in a channel associated mode and has a preset number of bits, a combination of commands transferred in the channel associated mode, or a signal identified by content change information of a slot position; and if the slot adjustment indication signal is a signal identified by content change information of the slot position, the method further comprises:

determining, if it is detected that slots in the received cell are increased and content information of a slot increased position has a first predetermined change, or slots in the received cell are decreased and content information of a slot decreased position has a second predetermined change, that the slot adjustment indication signal is detected, wherein the first predetermined change comprises the content information of the slot increased position changing from idle content to non-idle content, and the second predetermined change comprises the content information of the slot decreased position changing from non-idle content to idle content, and wherein if the detected cell state indication information carried in a cell indicates that no client service is carried in the current cell, the content information of the slot increased position is determined as idle content, and if the detected cell state indication information carried in a cell indicates that a client service is carried in the current cell, the content information of the slot increased position is determined as non-idle content.

8. The method according to claim 1, wherein the slot adjustment scheme comprises a slot adjustment position in a cell, and after completing the slot adjustment preparation on the current device and before detecting the slot adjustment indication signal, the method further comprises:

setting the current device to a slot adjustment intermediate transition stage, and carrying, at a sending port of the current device, the client service at a slot adjustment position in the cell according to a client service volume in a buffer of the current device;

extracting the client service at the receiving port of the current device according to content of the detected slot adjustment position or the cell state indication information carried in the cell; and ending, in response to detecting the slot adjustment indication signal, the slot adjustment intermediate transition stage of the current device.

9. The method according to claim 8, wherein the operation of carrying the client service at the slot adjustment position in the cell according to the client service volume in the buffer of the current device comprises:

carrying, if the client service volume in the buffer of the current device is greater than or equal to a preset upper threshold of service volume, the client service at all slot adjustment positions in the cell; filling, if the client service volume in the buffer of the current device is less than or equal to a preset lower threshold of service volume, idle content at all slot adjustment positions in the cell, and

the operation of extracting the client service at the receiving port of the current device according to content of the detected slot adjustment position or the cell state indication information carried in the cell comprises:

discarding, if it is detected that the content of the slot adjustment position in the cell received at the receiving port of the current device is idle content or the cell state indication information carried in the cell indicates that no client service is carried in the current cell, content of the slot adjustment position in the received cell; and extracting, if it is detected that the content of the slot adjustment position in the cell received at the receiving port of the current device is non-idle content or the cell state indication information carried in the cell indicates that a client service is carried in the current cell, content of the slot adjustment position in the received cell, and processing the extracted content as client content.

10. The method according to claim 8, wherein the slot adjustment scheme comprises an addition/deletion operation type, and before setting the current device to the slot adjustment intermediate transition stage, the method further comprises:

reserving, if the slot addition/deletion operation type is a slot addition operation, a storage space size for a client service volume corresponding to at least 1 slot in the buffer; and reserving, if the slot addition/deletion operation type is a slot deletion operation, a client service volume corresponding to at least 1 slot in the buffer.

11. The method according to claim 1, wherein the slot adjustment indication signal is a signal transferred after error detection and error correction, and/or the slot adjustment indication signal is one of a plurality of slot adjustment indication signals transferred from the predetermined device, after the operation of extracting and carrying the client service according to slots after the slot adjustment scheme is executed, the method further comprises:

feeding back a slot adjustment result to the predetermined device to indicate whether the current device has extracted and carried client services according to slots after the slot adjustment scheme is executed, and if the slot adjustment result fed back indicates that the current device does not execute slot adjustment, the method further comprises:

extracting and carrying, in response to a detected slot adjustment indication signal again, the client service according to slots after the slot adjustment scheme is executed, starting from a corresponding receiving cell and a corresponding sending cell.

12. The method according to claim 1, wherein the slot adjustment scheme comprises the number of slots to be adjusted, an addition/deletion operation type, a slot adjustment position in a cell, the operation of extracting and carrying, in response to detecting the slot adjustment indication signal, the client service according to slots after the slot adjustment scheme is executed, starting from the corresponding receiving cell and the corresponding sending cell comprises:

extracting, if the slot addition/deletion operation type is a slot addition operation, the client service at the slot adjustment position in the cell starting from the corresponding receiving cell according to the number of adjusted slots, and carrying the client service at the slot adjustment position in the cell starting from the corresponding sending cell; and

stopping extracting, if the slot addition/deletion operation type is a slot deletion operation, the client service at the slot adjustment position in the cell starting from the corresponding receiving cell according to the number of adjusted slots, and stopping carrying the client service at the slot adjustment position in the cell starting from the corresponding sending cell.

13. The method according to claim 1, wherein if the cell in the current device has a cell multi-frame structure, and the cell where the current device starts the slot adjustment has a designated cell number, the operation of extracting and carrying the client service according to slots after the slot adjustment scheme is executed, starting from the corresponding receiving cell and the corresponding sending cell comprises:

extracting, at the receiving port of the current device, starting from the corresponding receiving cell or starting from a designated cell in one or more cell multi-frame periods following a current cell multi-frame period, the client service according to slots after the slot adjustment scheme is executed; and carrying, at the sending port of the current device, starting from the corresponding sending cell or starting from a designated cell in one or more cell multi-frame periods following a current cell multi-frame period, the client service according to slots after the slot adjustment scheme is executed;

wherein the designated cell is a first cell or any cell after the first cell in a multi-frame period.

14. The method according to claim 1, wherein if the slot adjustment indication signal is a signal sent from a neighboring device in the network management path, after detecting the slot adjustment indication signal sent from the predetermined device, the method further comprises:

sending the slot adjustment indication signal to a next neighboring device in the network management path.

15. The method according to claim 1, wherein the slot adjustment request comprises a configuration request signal, the slot adjustment acknowledge signal comprises a configuration acknowledge signal, and the slot adjustment indication signal is a configuration come into force signal.

16. A service transmission method, comprising:

adjusting, in the bandwidth adjustment method according to claim 1, slots in a receiving cell and a sending cell of a current device; and sending a client service in the current device according to the adjusted slots in the receiving cell and the sending cell.

17. A network device, comprising:

one or more processors; and a memory having one or more programs stored thereon which, when executed by the one or more processors, cause the one or more processors to implement the bandwidth adjustment method according to claim 1.

18. A network device, comprising:

one or more processors; and a memory having one or more programs stored thereon which, when executed by the one or more processors, cause the one or more processors to implement the service transmission method according to claim 16.

19. A non-transitory computer-readable storage medium storing a computer program thereon which, when executed by a processor, causes the processor to implement the bandwidth adjustment method according to claim 1.

20. A non-transitory computer-readable storage medium storing a computer program thereon which, when executed by a processor, causes the processor to implement the service transmission method according to claim 16.

* * * * *